United States Patent
Mishra et al.

(10) Patent No.: US 10,642,778 B2
(45) Date of Patent: May 5, 2020

(54) SLAVE MASTER-WRITE/READ DATAGRAM PAYLOAD EXTENSION

(71) Applicant: QUALCOMM Incorporated, San Diego, CA (US)

(72) Inventors: Lalan Jee Mishra, San Diego, CA (US); Mohit Kishore Prasad, San Diego, CA (US); Richard Dominic Wietfeldt, San Diego, CA (US); Christopher Kong Yee Chun, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/678,827

(22) Filed: Nov. 8, 2019

(65) Prior Publication Data

US 2020/0073847 A1    Mar. 5, 2020

Related U.S. Application Data

(62) Division of application No. 15/966,687, filed on Apr. 30, 2018.

(Continued)

(51) Int. Cl.
*G06F 13/38* (2006.01)
*G06F 13/42* (2006.01)
*G06F 13/20* (2006.01)
*G06F 13/16* (2006.01)
*G06F 13/10* (2006.01)

(52) U.S. Cl.
CPC ........ *G06F 13/4282* (2013.01); *G06F 13/102* (2013.01); *G06F 13/1668* (2013.01); *G06F 13/20* (2013.01)

(58) Field of Classification Search
CPC ..................................................... G06F 13/00
See application file for complete search history.

(56) References Cited

U.S. PATENT DOCUMENTS 6,650,636 B1 * 11/2003 Bradshaw ........... G06F 11/0757
                                                        370/352
7,839,936 B2   11/2010 Vacanti
                (Continued)

FOREIGN PATENT DOCUMENTS

DE        4213792 A1    10/1993

OTHER PUBLICATIONS

International Search Report and Written Opinion—PCT/US2018/030376—ISA/EPO—dated Jul. 23, 2018.

*Primary Examiner* — Cheng Yuan Tseng
(74) *Attorney, Agent, or Firm* — Loza & Loza LLP

(57) ABSTRACT

Systems, methods, and apparatus for communicating datagrams over a serial communication link are provided. A transmitting device generates an address field in a datagram, sets a value of at least one bit in the address field to indicate a number of bytes of data associated with a data frame of the datagram, generates the data frame in the datagram, the data frame including the number of bytes of data, and sends the datagram to a receiving device. A receiving device receives a datagram from a transmitting device, decodes an address field of the datagram to detect a number of bytes of data included in a data frame of the datagram based on a value of at least one bit in the address field, and decodes the data frame to recover the detected number of bytes of data.

20 Claims, 27 Drawing Sheets

Related U.S. Application Data

(60) Provisional application No. 62/504,444, filed on May 10, 2017.

(56) References Cited

U.S. PATENT DOCUMENTS

| | | |
|---|---|---|
| 8,023,417 B2 | 9/2011 | Blackmore et al. |
| 8,320,372 B2 | 11/2012 | Menten |
| 8,429,320 B2 | 4/2013 | Du Preez et al. |
| 2008/0144642 A1 | 6/2008 | Song |
| 2017/0075843 A1 | 3/2017 | Wietfeldt et al. |
| 2017/0116141 A1 | 4/2017 | Mishra et al. |
| 2018/0011759 A1 | 1/2018 | Willey et al. |
| 2018/0329856 A1 | 11/2018 | Mishra et al. |

* cited by examiner

| RCS/Master Access | BC[3:2] Bit Configurations | Number of Bytes in Payload | |
|---|---|---|---|
| | | Load-Exponent Disabled | Load-Exponent Enabled |
| RCS → Master Write | BC[3:2] = [0,0] | 1 | 1 |
| | BC[3:2] = [0,1] | 2 | 2 |
| | BC[3:2] = [1,0] | 3 | 4 |
| | BC[3:2] = [1,1] | 4 | 8 |
| RCS ← Master Read | BC[3:2] = [0,0] | 1 | 1 |
| | BC[3:2] = [0,1] | 2 | 2 |
| | BC[3:2] = [1,0] | 3 | 4 |
| | BC[3:2] = [1,1] | 4 | 8 |

Master Read Datagram: 3-Byte Payload

| Command Frame | | | | Address | | | Data-0 | | | Data-1 | | | Data-2 | | |
|---|---|---|---|---|---|---|---|---|---|---|---|---|---|---|---|
| Command Code (0x15) | | | P | Adrs[7:0] | P | BP | Data[7:0] | P | | Data[7:0] | P | | Data[7:0] | P | BP |
| 0x15 | | | | | | | | | | | | | | | |
| 0 | 0 | 0 | | | | | | | | | | | | | |
| 0 | 0 | 1 | | | | | | | | | | | | | |
| 0 | 1 | 0 | | | | | | | | | | | | | |
| 1 | 0 | 1 | 1 | 0x00-0xFF | P | BP | 0x00-0xFF | P | | 0x00-0xFF | P | | 0x00-0xFF | P | BP |
| BC[3:2] | MA[1:0] | | | | | | | | | | | | | | |
| [3:0] | | | | | | | | | | | | | | | |
| 1 | 0 | X | | | | | | | | | | | | | |

Master Read Datagram: 4-Byte Payload

| Command Frame | | | | Address | | | Data-0 | | | Data-1 | | | Data-2 | | | Data-3 | | |
|---|---|---|---|---|---|---|---|---|---|---|---|---|---|---|---|---|---|---|
| Command Code (0x15) | | | P | Adrs[7:0] | P | BP | Data[7:0] | P | BP | Data[7:0] | P | | Data[7:0] | P | | Data[7:0] | P | BP |
| 0x15 | | | | | | | | | | | | | | | | | | |
| 0 | 0 | 0 | | | | | | | | | | | | | | | | |
| 0 | 0 | 1 | | | | | | | | | | | | | | | | |
| 0 | 1 | 0 | | | | | | | | | | | | | | | | |
| 1 | 0 | 1 | 1 | 0x00-0xFF | P | BP | 0x00-0xFF | P | BP | 0x00-0xFF | P | | 0x00-0xFF | P | | 0x00-0xFF | P | BP |
| BC[3:2] | MA[1:0] | | | | | | | | | | | | | | | | | |
| [3:0] | | | | | | | | | | | | | | | | | | |
| 1 | 1 | X | | | | | | | | | | | | | | | | |

| C3 | C2 | C1 | C0 | Byte Count |
|----|----|----|----|------------|
| 0  | 0  | 0  | 0  | 1          |
| 0  | 0  | 0  | 1  | 2          |
| 0  | 0  | 1  | 0  | 3          |
| 0  | 0  | 1  | 1  | 4          |
| 0  | 1  | 0  | 0  | 5          |
| 0  | 1  | 0  | 1  | 6          |
| 0  | 1  | 1  | 0  | 7          |
| 0  | 1  | 1  | 1  | 8          |
| 1  | 0  | 0  | 0  | 9          |
| 1  | 0  | 0  | 1  | 10         |
| 1  | 0  | 1  | 0  | 11         |
| 1  | 0  | 1  | 1  | 12         |
| 1  | 1  | 0  | 0  | 13         |
| 1  | 1  | 0  | 1  | 14         |
| 1  | 1  | 1  | 0  | 15         |
| 1  | 1  | 1  | 1  | 16         |

2202 — (row with 0,0,0,0,1)
2204 — (row with 1,0,1,1,12)

*FIG. 22*

SLAVE MASTER-WRITE/READ DATAGRAM PAYLOAD EXTENSION

CROSS-REFERENCE TO RELATED APPLICATIONS

This application is a divisional application of U.S. Non-Provisional patent application Ser. No. 15/966,687, filed on Apr. 30, 2018, titled "SLAVE MASTER-WRITE/READ DATAGRAM PAYLOAD EXTENSION", which claims priority to and the benefit of U.S. Provisional Patent Application No. 62/504,444, filed on May 10, 2017, titled "SLAVE MASTER-WRITE/READ DATAGRAM PAYLOAD EXTENSION", the entire contents of which are incorporated herein by reference.

TECHNICAL FIELD

The present disclosure relates generally to serial communication and, more particularly, to communicating datagrams with an extended payload over a serial communication link.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a serial bus or a parallel bus. General-purpose serial interfaces known in the industry include the Inter-Integrated Circuit (I2C or I²C) serial bus and its derivatives and alternatives, including interfaces defined by the Mobile Industry Processor Interface (MIPI) Alliance, such as I3C and the Radio Frequency Front-End (RFFE) interface.

In one example, the I2C serial bus is a serial single-ended computer bus that was intended for use in connecting low-speed peripherals to a processor. Some interfaces provide multi-master buses in which two or more devices can serve as a bus master for different messages transmitted on the serial bus. In another example, the RFFE interface defines a communication interface for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communications device, multiple antennas and radio transceivers may support multiple concurrent RF links.

In many instances, a number of command and control signals are employed to connect different component devices in mobile communication devices. These connections consume precious general-purpose input/output (GPIO) pins within the mobile communication devices and it would be desirable to replace the physical interconnects with signals carried in information transmitted over existing serial data links. However, the serial data links are associated with latencies that can prevent conversion of physical command and control signals to virtual signals, particularly in real-time embedded system applications supported by mobile communication devices that define firm transmission deadlines.

As mobile communication devices continue to include a greater level of functionality, improved serial communication techniques are needed to support low-latency transmissions between peripherals and application processors.

SUMMARY

Certain aspects of the disclosure relate to systems, apparatus, methods and techniques that can communicate datagrams with an extended payload over a serial communication link.

In various aspects of the disclosure, a method performed at a transmitting device for sending a datagram to a receiving device, includes communicating a configuration message indicating whether a load-exponent mode is enabled or disabled, generating an address field in a datagram, setting a value of at least one bit in the address field to indicate a number of bytes of data associated with a data frame of the datagram, generating the data frame in the datagram, the data frame including the number of bytes of data, and sending the datagram to the receiving device via a bus interface.

In an aspect, the transmitting device is a request-capable slave (RCS) and the datagram is sent across a system power management interface (SPMI) bus. In an aspect, the datagram is a master read datagram provoking the receiving device to perform a read operation with respect to the data included in the data frame. Alternatively, the datagram is a master write datagram provoking the receiving device to perform a write operation with respect to the data included in the data frame.

In an aspect, the setting the value of the at least one bit in the address field includes detecting the number of bytes of data associated with the data frame, detecting whether a load-exponent mode is enabled or disabled, and setting at least a first bit value and a second bit value in the address field according to the detected number of bytes of data and whether the load-exponent mode is enabled or disabled.

In an aspect, if the load-exponent mode is disabled, the detected number of bytes of data is equal to M+1, where M is an integer greater than or equal to 0 and less than or equal to 3 ($0 \leq M \leq 3$), and the first bit value and the second bit value are set such that a binary coded decimal value of the first bit value and the second bit value is equal to M. In another aspect, if the load-exponent mode is enabled, the detected number of bytes of data is equal to $2^N$, where N is an integer greater than or equal to 0 and less than or equal to 3 ($0 \leq N \leq 3$), and the first bit value and the second bit value are set such that a binary coded decimal value of the first bit value and the second bit value is equal to N.

In an aspect, the setting the value of the at least one bit in the address field further includes setting a third bit value and a fourth bit value in the address field according to the detected number of bytes of data and whether the load-exponent mode is enabled or disabled. If the load-exponent mode is disabled, the detected number of bytes of data is equal to P+1, where P is an integer greater than or equal to 0 and less than or equal to 15 ($0 \leq P \leq 15$), and the first bit value, the second bit value, the third bit value, and the fourth bit value are set such that a binary coded decimal value of the first bit value, the second bit value, the third bit value, and the fourth bit value is equal to P. If the load-exponent mode is enabled, the detected number of bytes of data is equal to $2^Q + 2^R$, where Q is an integer greater than or equal to 0 and less than or equal to 3 ($0 \leq Q \leq 3$), R is an integer greater than or equal to 0 and less than or equal to 3 ($0 \leq R \leq 3$), the first bit value and the second bit value are set such that a binary coded decimal value of the first bit value and the second bit value is equal to Q, and the third bit value and the fourth bit value are set such that a binary coded decimal value of the third bit value and the fourth bit value is equal to R.

In an aspect, the generating the address field includes setting bit values of other bits (e.g., a third bit value and a fourth bit value) in the address field corresponding to an address of the receiving device. In another aspect, the generating the data frame includes providing a bus park (BP) at an end of the number of bytes of data in the data frame. In a further aspect, the generating the data frame includes providing a bus park (BP) between each byte of data of the number of bytes of data in the data frame.

In various aspects of the disclosure, a transmitting device for sending a datagram to a receiving device, includes a bus interface and a processing circuit coupled to the bus interface. The processing circuit is configured to communicate a configuration message indicating whether a load-exponent mode is enabled or disabled, generate an address field in a datagram, set a value of at least one bit in the address field to indicate a number of bytes of data associated with a data frame of the datagram, generate the data frame in the datagram, the data frame including the number of bytes of data, and send the datagram to the receiving device via the bus interface.

In various aspects of the disclosure, a transmitting device for sending a datagram to a receiving device, includes means for communicating a configuration message indicating whether a load-exponent mode is enabled or disabled, means for generating an address field in a datagram, means for setting a value of at least one bit in the address field to indicate a number of bytes of data associated with a data frame of the datagram, means for generating the data frame in the datagram, the data frame including the number of bytes of data, and means for sending the datagram to the receiving device via a bus interface.

In various aspects of the disclosure, a processor-readable storage medium having one or more instructions which, when executed by at least one processor or state machine of a processing circuit, cause the processing circuit to communicate a configuration message indicating whether a load-exponent mode is enabled or disabled, generate an address field in a datagram, set a value of at least one bit in the address field to indicate a number of bytes of data associated with a data frame of the datagram, generate the data frame in the datagram, the data frame including the number of bytes of data, and send the datagram to the receiving device via the bus interface.

In various aspects of the disclosure, a method performed at a receiving device for receiving a datagram from a transmitting device, includes communicating a configuration message indicating whether a load-exponent mode is enabled or disabled, receiving a datagram from the transmitting device via a bus interface, decoding an address field of the datagram to detect a number of bytes of data included in a data frame of the datagram based on a value of at least one bit in the address field, and decoding the data frame to recover the detected number of bytes of data.

In an aspect, the transmitting device is a request-capable slave (RCS) and the datagram is received across a system power management interface (SPMI) bus. In another aspect, the datagram is a master read datagram provoking the receiving device to perform a read operation with respect to the data included in the data frame. Alternatively, the datagram is a master write datagram provoking the receiving device to perform a write operation with respect to the data included in the data frame.

In an aspect, the decoding the address field includes reading a first bit value and a second bit value in the address field, detecting whether a load-exponent mode is enabled or disabled, and detecting the number of bytes of data included in the data frame based on at least the first bit value and the second bit value and whether the load-exponent mode is enabled or disabled.

In an aspect, the detecting the number of bytes of data included in the data frame includes calculating a binary coded decimal value of the first bit value and the second bit value. If the load-exponent mode is disabled, the binary coded decimal value of the first bit value and the second bit value is equal to M, where M is an integer greater than or equal to 0 and less than or equal to 3 ($0 \leq M \leq 3$), and the detected number of bytes of data is equal to M+1. If the load-exponent mode is enabled, the binary coded decimal value of the first bit value and the second bit value is equal to N, where N is an integer greater than or equal to 0 and less than or equal to 3 ($0 \leq N \leq 3$), and the detected number of bytes of data is equal to $2^N$.

In another aspect, the decoding the address field further includes reading a third bit value and a fourth bit value in the address field and detecting the number of bytes of data included in the data frame further based on the third bit value and the fourth bit value. If the load-exponent mode is disabled, the detecting the number of bytes includes calculating a binary coded decimal value of the first bit value, the second bit value, the third bit value, and the fourth bit value, wherein the binary coded decimal value of the first bit value, the second bit value, the third bit value, and the fourth bit value is equal to P, where P is an integer greater than or equal to 0 and less than or equal to 15 ($0 \leq P \leq 15$), and the detected number of bytes of data is equal to P+1. If the load-exponent mode is enabled, the detecting the number of bytes includes calculating a first binary coded decimal value of the first bit value and the second bit value wherein the first binary coded decimal value of the first bit value and the second bit value is equal to Q, where Q is an integer greater than or equal to 0 and less than or equal to 3 ($0 \leq Q \leq 3$), and calculating a second binary coded decimal value of the third bit value and the fourth bit value, wherein the second binary coded decimal value of the third bit value and the fourth bit value is equal to R, where R is an integer greater than or equal to 0 and less than or equal to 3 ($0 \leq R \leq 3$), and the detected number of bytes of data is equal to $2^Q + 2^R$.

In an aspect, the decoding the address field includes detecting whether bit values of other bits (e.g., a third bit value and a fourth bit value) in the address field correspond to an address of the receiving device. In another aspect, the decoding the data frame includes detecting a bus park (BP) at an end of the number of bytes of data in the data frame. In a further aspect, the decoding the data frame includes detecting a bus park (BP) between each byte of data of the number of bytes of data in the data frame.

In various aspects of the disclosure, a receiving device for receiving a datagram from a transmitting device, includes a bus interface and a processing circuit coupled to the bus interface. The processing circuit is configured to communicate a configuration message indicating whether a load-exponent mode is enabled or disabled, receive a datagram from the transmitting device via a bus interface, decode an address field of the datagram to detect a number of bytes of data included in a data frame of the datagram based on a value of at least one bit in the address field, and decode the data frame to recover the detected number of bytes of data.

In various aspects of the disclosure, a receiving device for receiving a datagram from a transmitting device, includes means for communicating a configuration message indicating whether a load-exponent mode is enabled or disabled, means for receiving a datagram from the transmitting device via a bus interface, means for decoding an address field of the datagram to detect a number of bytes of data included in a data frame of the datagram based on a value of at least one bit in the address field, and means for decoding the data frame to recover the detected number of bytes of data.

In various aspects of the disclosure, a processor-readable storage medium having one or more instructions which, when executed by at least one processor or state machine of a processing circuit, cause the processing circuit to communicate a configuration message indicating whether a load-exponent mode is enabled or disabled, receive a datagram from the transmitting device via a bus interface, decode an address field of the datagram to detect a number of bytes of data included in a data frame of the datagram based on a value of at least one bit in the address field, and decode the data frame to recover the detected number of bytes of data.

BRIEF DESCRIPTION OF THE DRAWINGS

FIG. 16 is a table summarizing the number of bytes of data payload capable of being indicated to the SPMI master based on the bit configurations shown in FIG. 15.

FIG. 18 illustrates example master write datagrams indicating three bytes or four bytes of data payload to be written.

FIG. 20 illustrates example master read datagrams indicating three bytes or four bytes of data payload to be read.

FIG. 22 illustrates an example table of different bit values of an address field for indicating a byte count in a data frame according to certain aspects of the disclosure.

DETAILED DESCRIPTION

Figure 1:
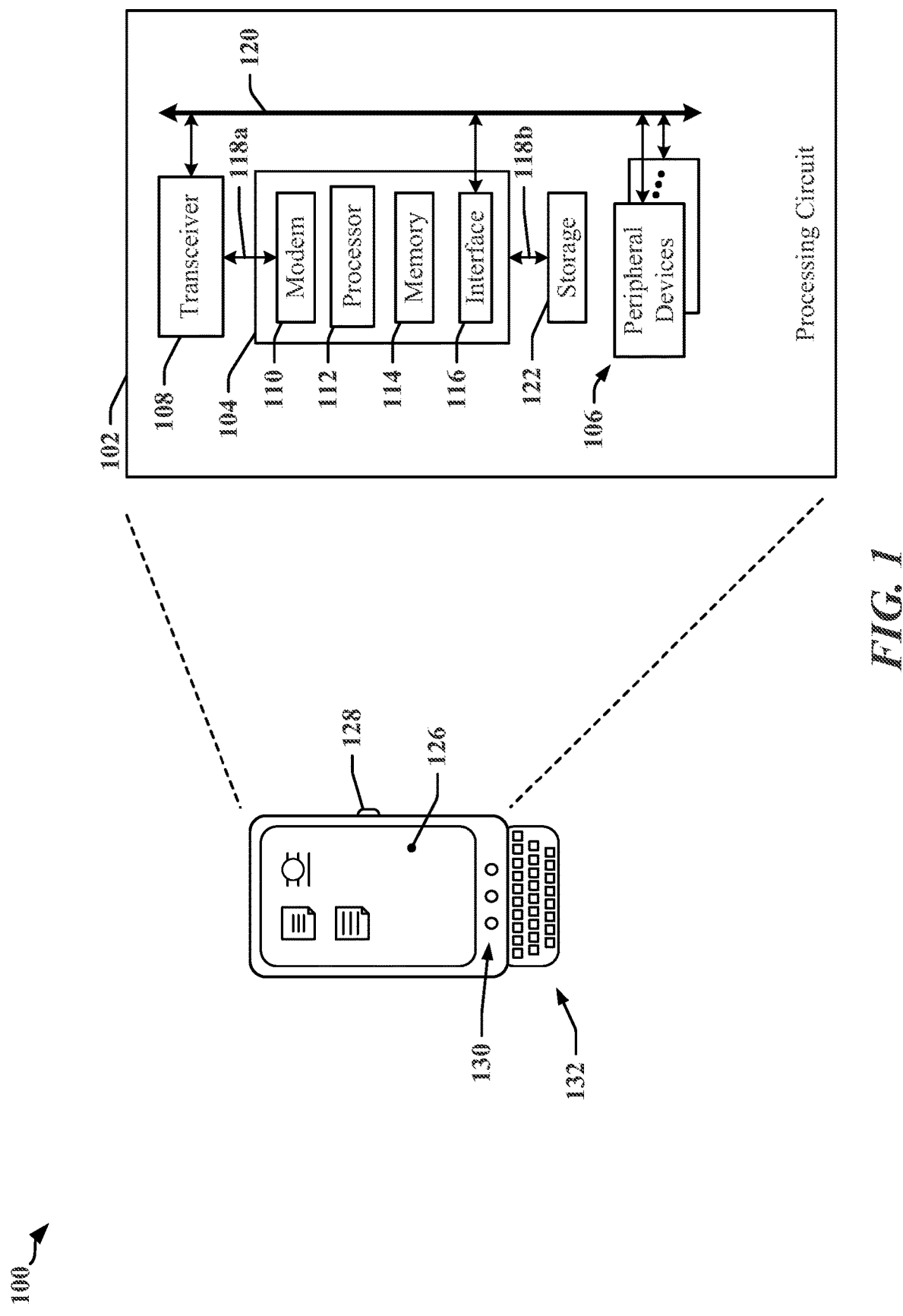
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols defined. In one example, a serial bus may be operated in accordance with I2C, I3C, and/or RFFE, protocols. According to certain aspects disclosed herein, GPIO pins and signals may be virtualized into GPIO state information that may be transmitted over a data communication link Virtualized GPIO state information may be transmitted over a variety of communication links, including links that include wired and wireless communication links. For example, virtualized GPIO state information can be packetized or otherwise formatted for transmission over wireless networks including Bluetooth, Wireless LAN, cellular networks, etc. Examples involving wired communication links are described herein to facilitate understanding of certain aspects.

A number of different protocol schemes may be used for communicating messaging and data over communication links Existing protocols have well-defined and immutable structures in the sense that their structures cannot be changed to optimize transmission latencies based on variations in use cases, and/or coexistence with other protocols, devices and applications. It is an imperative of real-time embedded systems that certain deadlines be met. In certain real-time applications, meeting transmission deadlines is of paramount importance. When a common bus supports different protocols it is generally difficult or impossible to guarantee optimal latency under all use cases. In some examples, an I2C, I3C or RFFE system power management interface (SPMI) serial communication bus may be used to tunnel different protocols with different latency requirements, different data transmission volumes, and/or different transmission schedules.

Certain aspects disclosed herein provide methods, circuits, and systems that are adapted to communicate datagrams with an extended payload over a serial communication link. A device is enabled to provoke multiple bytes of data to be written or read using a single datagram, thus eliminating the need to send multiple datagrams, and therefore, reduce latency.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include a processing circuit 102 having multiple circuits or devices 104, 106, and/or 108, which may be implemented in one or more application-specific integrated circuits (ASICs) or in a SoC. In one example, the apparatus 100 may be a communication device and the processing circuit 102 may include a processing device provided in an ASIC 104, one or more peripheral devices 106, and a transceiver 108 that enables the apparatus to communicate with a radio access network, a core access network, the Internet, and/or another network.

The ASIC 104 may have one or more processors 112, one or more modems 110, on-board memory 114, a bus interface circuit 116, and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as a display 126, operator controls, such as switches or buttons 128, 130, and/or an integrated or external keypad 132, among other components. A user interface module may be configured to operate with the display 126, keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic, and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
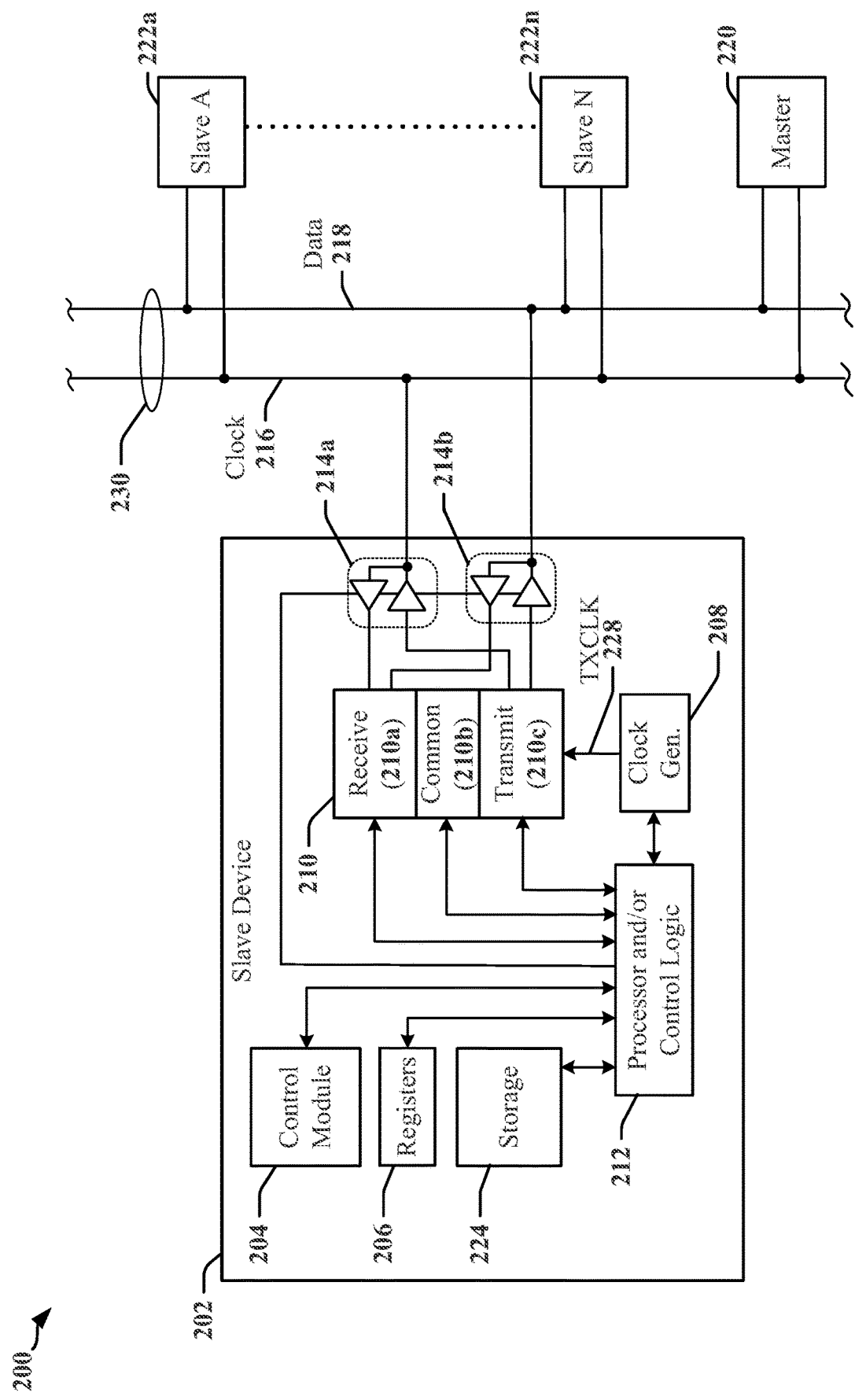
FIG. 2 illustrates a system architecture for an apparatus employing a data link between IC devices.

FIG. 2 illustrates certain aspects of an apparatus 200 that includes multiple devices 202, 220, and 222a-222n connected to a serial bus 230. The devices 202, 220, and 222a-222n may include one or more semiconductor IC devices, such as an applications processor, SoC or ASIC. Each of the devices 202, 220, and 222a-222n may include, support or operate as a modem, a signal processing device, a display driver, a camera, a user interface, a sensor, a sensor controller, a media player, a transceiver, and/or other such components or devices. Communications between devices 202, 220, and 222a-222n over the serial bus 230 are controlled by a bus master 220. Certain types of bus can support multiple bus masters 220.

The apparatus 200 may include multiple devices 202, 220, and 222a-222n that communicate when the serial bus 230 is operated in accordance with I2C, I3C, or other protocols. At least one device 202, 222a-222n may be configured to operate as a slave device on the serial bus 230. In one example, a slave device 202 may be adapted to provide a control function 204. In some examples, the control function 204 may include circuits and modules that support a display, an image sensor, and/or circuits and modules that control and communicate with one or more sensors that measure environmental conditions. The slave device 202 may include configuration registers 206 or other storage 224, control logic 212, a transceiver 210 and line drivers/receivers 214a and 214b. The control logic 212 may include a processing circuit such as a state machine, sequencer, signal processor, or general-purpose processor. The transceiver 210 may include a receiver 210a, a transmitter 210c, and common circuits 210b, including timing, logic, and storage circuits and/or devices. In one example, the transmitter 210c encodes and transmits data based on timing in one or more signals 228 provided by a clock generation circuit 208.

Two or more of the devices 202, 220, and/or 222a-222n may be adapted according to certain aspects and features disclosed herein to support a plurality of different communication protocols over a common bus, which may include an I2C, and/or I3C protocol. In some instances, devices that communicate using the I2C protocol can coexist on the same 2-wire interface with devices that communicate using I3C protocols. In one example, the I3C protocols may support a mode of operation that provides a data rate between 6 megabits per second (Mbps) and 16 Mbps with one or more optional high-data-rate (HDR) modes of operation that provide higher performance. The I2C protocols may conform to de facto I2C standards providing for data rates that may range between 100 kilobits per second (kbps) and 3.2 megabits per second (Mbps). I2C and I3C protocols may define electrical and timing aspects for signals transmitted on the 2-wire serial bus 230, in addition to data formats and aspects of bus control. In some aspects, the I2C and I3C protocols may define direct current (DC) characteristics affecting certain signal levels associated with the serial bus 230, and/or alternating current (AC) characteristics affecting certain timing aspects of signals transmitted on the serial bus 230. In some examples, a 2-wire serial bus 230 transmits data on a first wire 218 and a clock signal on a second wire 216. In some instances, data may be encoded in the signaling state, or transitions in signaling state of the first wire 218 and the second wire 216.

Figure 3:
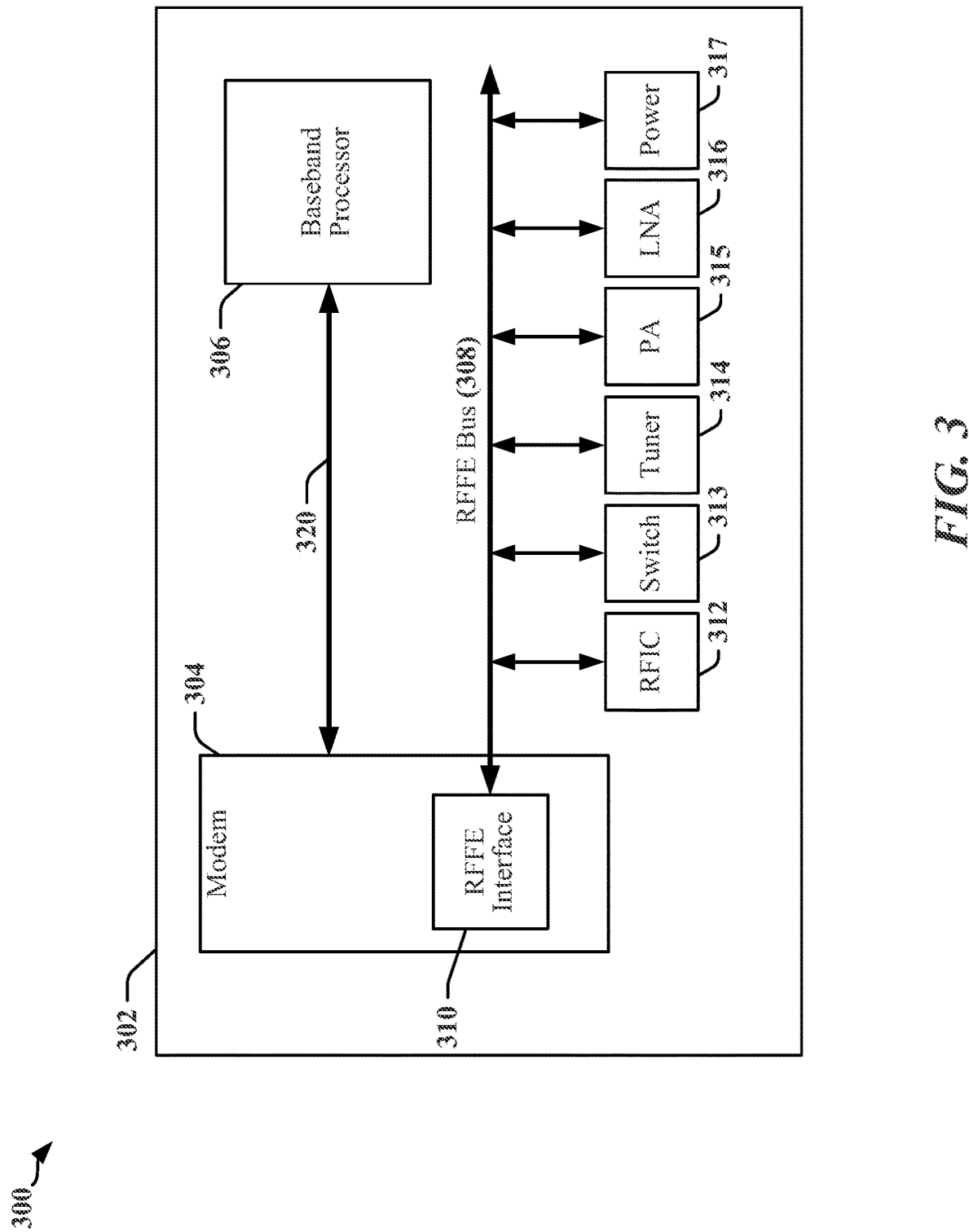
FIG. 3 illustrates a device that employs an RFFE bus to couple various radio frequency front-end devices.

FIG. 3 is a block diagram 300 illustrating an example of a device 302 that employs an RFFE bus 308 to couple various front-end devices 312-317. Although the device 302 will be described with respect to an RFFE interface, it is contemplated that the device 302 may also apply to a system power management interface (SPMI) and other multi-drop serial interfaces. A modem 304 may include an RFFE interface 310 that couples the modem 304 to the RFFE bus 308. The modem 304 may communicate with a baseband processor 306. The illustrated device 302 may be embodied in one or more of a mobile communication device, a mobile telephone, a mobile computing system, a mobile telephone, a notebook computer, a tablet computing device, a media player, a gaming device, a wearable computing and/or communications device, an appliance, or the like. In various examples, the device 302 may be implemented with one or more baseband processors 306, modems 304, multiple communications links 308, 320, and various other buses, devices and/or different functionalities. In the example illustrated in FIG. 3, the RFFE bus 308 may be coupled to an RF integrated circuit (RFIC) 312, which may include one or more controllers, and/or processors that configure and control certain aspects of the RF front-end. The RFFE bus 308 may couple the RFIC 312 to a switch 313, an RF tuner 314, a power amplifier (PA) 315, a low noise amplifier (LNA) 316 and a power management module 317.

Figure 4:
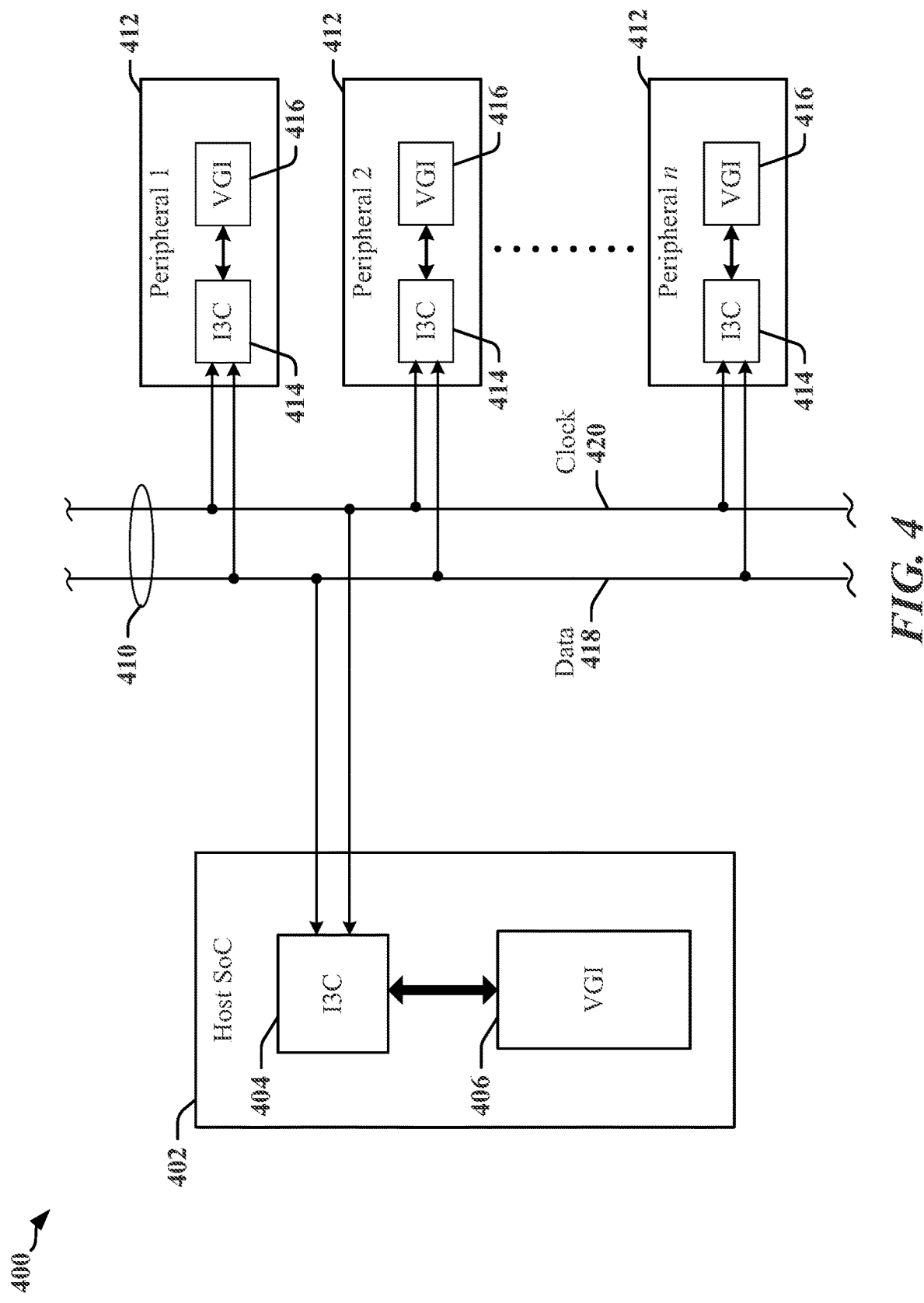
FIG. 4 illustrates a device that employs an I3C bus to couple various front-end devices in accordance with certain aspects disclosed herein.

FIG. 4 illustrates an example of an apparatus 400 that uses an I3C bus to couple various devices including a host SoC 402 and a number of peripheral devices 412. The host SoC 402 may include a virtual GPIO finite state machine (VGI FSM 406) and an I3C interface 404, where the I3C interface 404 cooperates with corresponding I3C interfaces 414 in the peripheral devices 412 to provide a communication link between the host SoC 402 and the peripheral devices 412. Each peripheral device 412 includes a VGI FSM 416. In the illustrated example, communications between the SoC 402 and a peripheral device 412 may be serialized and transmitted over a multi-wire serial bus 410 in accordance with an I3C protocol. In other examples, the host SoC 402 may include other types of interface, including I2C and/or RFFE interfaces. In other examples, the host SoC 402 may include a configurable interface that may be employed to communicate using I2C, I3C, RFFE and/or another suitable protocol. In some examples, a multi-wire serial bus 410, such as an I2C or I3C bus, may transmit a data signal over a data wire 418 and a clock signal over a clock wire 420.

Signaling Virtual GPIO Configuration Information

Figure 5:
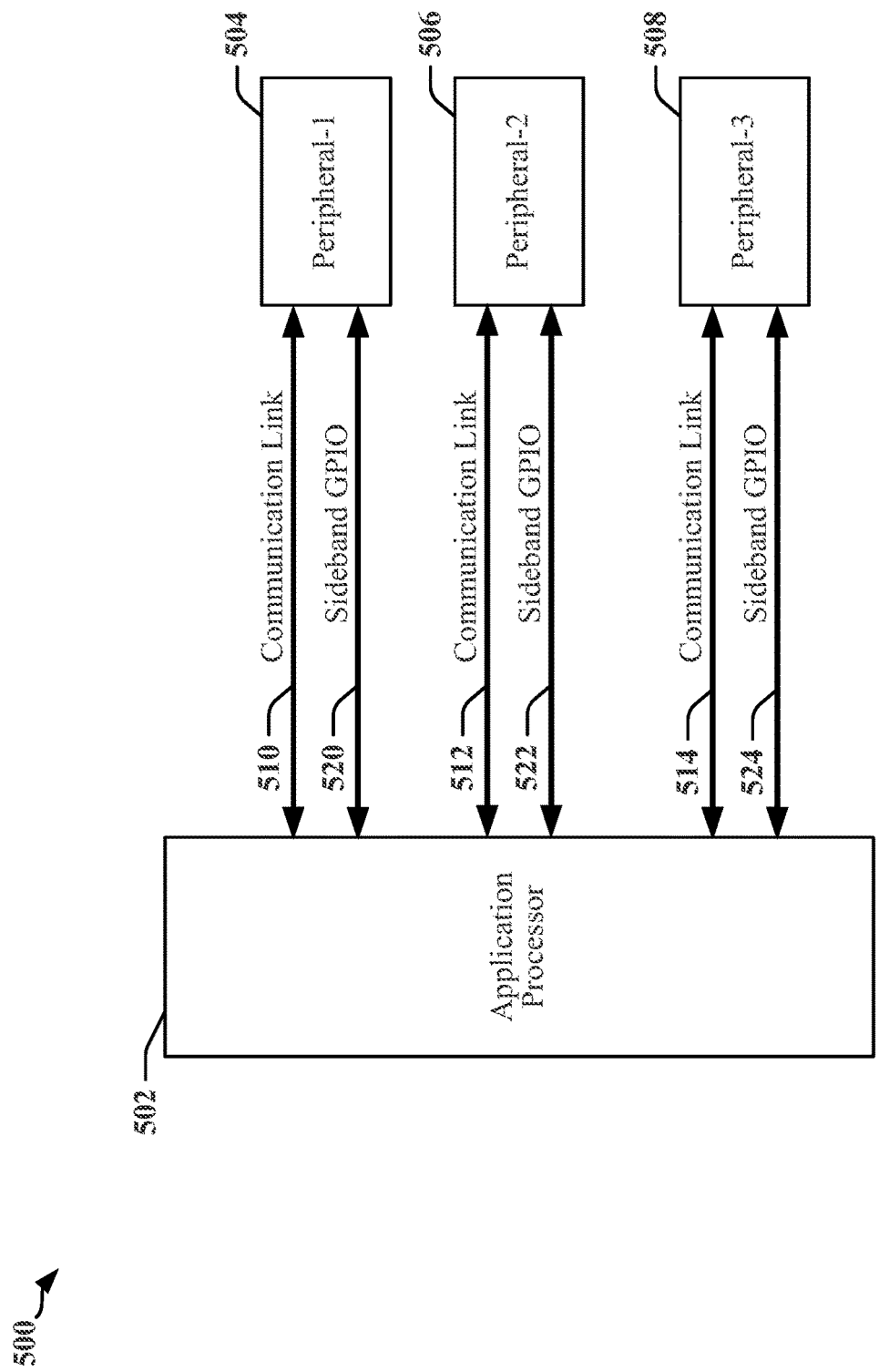
FIG. 5 illustrates an apparatus that includes an Application Processor and multiple peripheral devices that may be adapted according to certain aspects disclosed herein.

Mobile communication devices, and other devices that are related or connected to mobile communication devices, increasingly provide greater capabilities, performance and functionalities. In many instances, a mobile communication device incorporates multiple IC devices that are connected using a variety of communications links FIG. 5 illustrates an apparatus 500 that includes an Application Processor 502 and multiple peripheral devices 504, 506, 508. In the example, each peripheral device 504, 506, 508 communicates with the Application Processor 502 over a respective communication link 510, 512, 514 operated in accordance with mutually different protocols. Communication between the Application Processor 502 and each peripheral device 504, 506, 508 may involve additional wires that carry control or command signals between the Application Processor 502 and the peripheral devices 504, 506, 508. These additional wires may be referred to as sideband general purpose input/output (sideband GPIO 520, 522, 524), and in some instances the number of connections needed for sideband GPIO 520, 522, 524 can exceed the number of connections used for a communication link 510, 512, 514.

GPIO provides generic pins/connections that may be customized for particular applications. For example, a GPIO pin may be programmable to function as an output, input pin or a bidirectional pin, in accordance with application needs. In one example, the Application Processor 502 may assign and/or configure a number of GPIO pins to conduct handshake signaling or inter-processor communication (IPC) with a peripheral device 504, 506, 508 such as a modem. When handshake signaling is used, sideband signaling may be symmetric, where signaling is transmitted and received by the Application Processor 502 and a peripheral device 504, 506, 508. With increased device complexity, the increased number of GPIO pins used for IPC communication may significantly increase manufacturing cost and limit GPIO availability for other system-level peripheral interfaces.

According to certain aspects, the state of GPIO, including GPIO associated with a communication link, may be captured, serialized and transmitted over a data communication link In one example, captured GPIO may be transmitted in packets over an I3C bus using common command codes to indicate packet content and/or destination.

Figure 6:
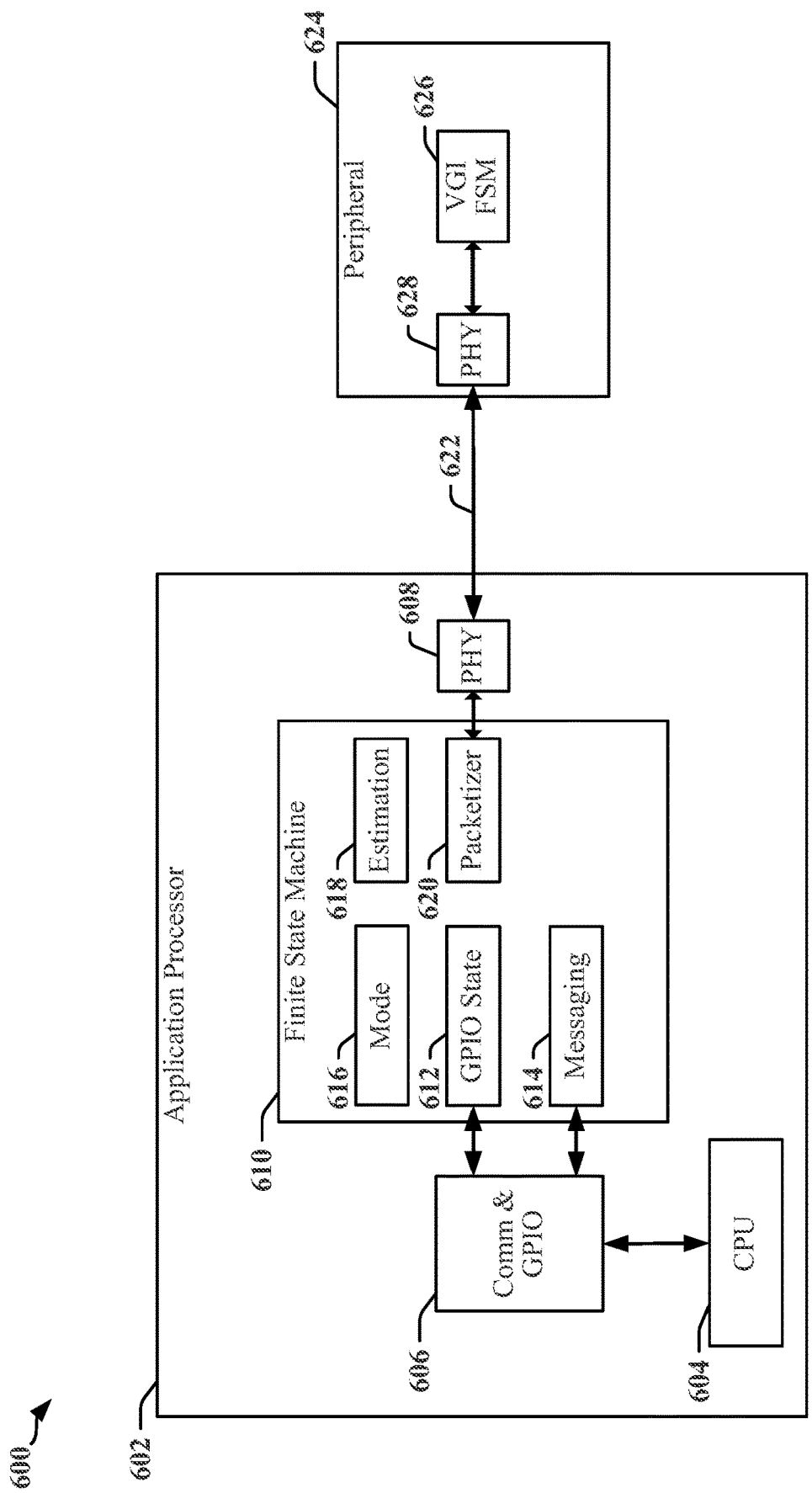
FIG. 6 illustrates an apparatus that has been adapted to support Virtual GPIO in accordance with certain aspects disclosed herein.

FIG. 6 illustrates an apparatus 600 that is adapted to support Virtual GPIO (VGI or VGMI) in accordance with certain aspects disclosed herein. VGI circuits and techniques can reduce the number of physical pins and connections used to connect an Application Processor 602 with a peripheral device 624. VGI enables a plurality of GPIO signals to be serialized into virtual GPIO signals that can be transmitted over a communication link 622. In one example, virtual GPIO signals may be encoded in packets that are transmitted over a communication link 622 that includes a multi-wire bus, including a serial bus. When the communication link 622 is provided as serial bus, the receiving peripheral device 624 may deserialize received packets and may extract messages and virtual GPIO signals. A VGI FSM 626 in the peripheral device 624 may convert the virtual GPIO signals to physical GPIO signals that can be presented at an internal GPIO interface.

In another example, the communication link 622 may be a provided by a radio frequency transceiver that supports communication using, for example, a Bluetooth protocol, a wireless local area network (WLAN) protocol, a cellular wide area network, and/or another communication protocol. Messages and virtual GPIO signals may be encoded in packets, frames, subframes, or other structures that can be transmitted over the communication link 622, and the receiving peripheral device 624 may extract, deserialize and otherwise process received signaling to obtain the messages and virtual GPIO signals. Upon receipt of messages and/or virtual GPIO signals, the VGI FSM 626 or another component of the receiving device may interrupt its host processor to indicate receipt of messages and/or any changes in GPIO signals.

In an example in which the communication link 622 is provided as a serial bus, messages and/or virtual GPIO signals may be transmitted in packets configured for an I2C, I3C, RFFE, or another standardized serial interface. In the illustrated example, VGI techniques are employed to accommodate I/O bridging between an Application Processor 602 and a peripheral device 624. The Application Processor 602 may be implemented as an ASIC, SoC, or some combination of devices. The Application Processor 602 includes a processor (central processing unit or CPU 604) that generates messages and GPIO associated with one or more communications channels 606. GPIO signals and messages produced by the communications channels 606 may be monitored by respective monitoring circuits 612, 614 in a VGI FSM 626. In some examples, a GPIO monitoring circuit 612 may be adapted to produce virtual GPIO signals representative of the state of physical GPIO signals and/or changes in the state of the physical GPIO signals. In some examples, other circuits are provided to produce the virtual GPIO signals representative of the state of physical GPIO signals and/or changes in the state of the physical GPIO signals.

An estimation circuit 618 may be configured to estimate latency information for the GPIO signals and messages, and may select a protocol, and/or a mode of communication for the communication link 622 that optimizes the latency for encoding and transmitting the GPIO signals and messages. The estimation circuit 618 may maintain protocol and mode information 616 that characterizes certain aspects of the communication link 622 to be considered when selecting the protocol, and/or a mode of communication. The estimation circuit 618 may be further configured to select a packet type for encoding and transmitting the GPIO signals and messages. The estimation circuit 618 may provide configuration information used by a packetizer 620 to encode the GPIO signals and messages. In one example, the configuration information is provided as a command that may be encapsulated in a packet such that the type of packet can be determined at a receiver. The configuration information, which may be a command, may also be provided to physical layer circuits (PHY 608). The PHY 608 may use the configuration information to select a protocol and/or mode of communication for transmitting the associated packet. The PHY 608 may then generate the appropriate signaling to transmit the packet.

The peripheral device 624 may include a VGI FSM 626 that may be configured to process data packets received from the communication link 622. The VGI FSM 626 at the peripheral device 624 may extract messages and may map bit positions in virtual GPIO signals onto physical GPIO pins in the peripheral device 624. In certain embodiments, the communication link 622 is bidirectional, and both the Application Processor 602 and a peripheral device 624 may operate as both transmitter and receiver.

The PHY 608 in the Application Processor 602 and a corresponding PHY 628 in the peripheral device 624 may be configured to establish and operate the communication link 622. The PHY 608 and 628 may be coupled to, or include a transceiver 108 (see FIG. 1). In some examples, the PHY 608 and 628 may support a two-wire interface such as an I2C, I3C, RFFE, or SMBus interface at the Application Processor 602 and peripheral device 624, respectively, and virtual GPIO signals and messages may be encapsulated into a packet transmitted over the communication link 622, which may be a multi-wire serial bus or multi-wire parallel bus for example.

VGI tunneling, as described herein, can be implemented using existing or available protocols configured for operating the communication link 622, and without the full complement of physical GPIO pins. VGI FSMs 610, 626 may handle GPIO signaling without intervention of a processor in the Application Processor 602 and/or in the peripheral device 624. The use of VGI can reduce pin count, power consumption, and latency associated with the communication link 622.

At the receiving device virtual GPIO signals are converted into physical GPIO signals. Certain characteristics of the physical GPIO pins may be configured using the virtual GPIO signals. For example, slew rate, polarity, drive strength, and other related parameters and attributes of the physical GPIO pins may be configured using the virtual GPIO signals. Configuration parameters used to configure the physical GPIO pins may be stored in configuration registers associated with corresponding GPIO pins. These configuration parameters can be addressed using a proprietary or conventional protocol such as I2C, I3C or RFFE. In one example, configuration parameters may be maintained in I3C addressable registers. Certain aspects disclosed herein relate to reducing latencies associated with the transmission of configuration parameters and corresponding addresses (e.g., addresses of registers used to store configuration parameters).

The VGI interface enables transmission of messages and virtual GPIO signals, whereby virtual GPIO signals, messages, or both can be sent in the serial data stream over a wired or wireless communication link 622. In one example, a serial data stream may be transmitted in packets and/or as a sequence of transactions over an I2C, I3C, or RFFE bus. The presence of virtual GPIO data in I2C/I3C frame may be signaled using a special command code to identify the frame as a VGPIO frame. VGPIO frames may be transmitted as broadcast frames or addressed frames in accordance with an I2C or I3C protocol. In some implementations, a serial data stream may be transmitted in a form that resembles a universal asynchronous receiver/transmitter (UART) signaling and messaging protocol, in what may be referred to as UART_VGI mode of operation. This may also be referred to as a VGI messaging interface or VGMI.

Figure 7:
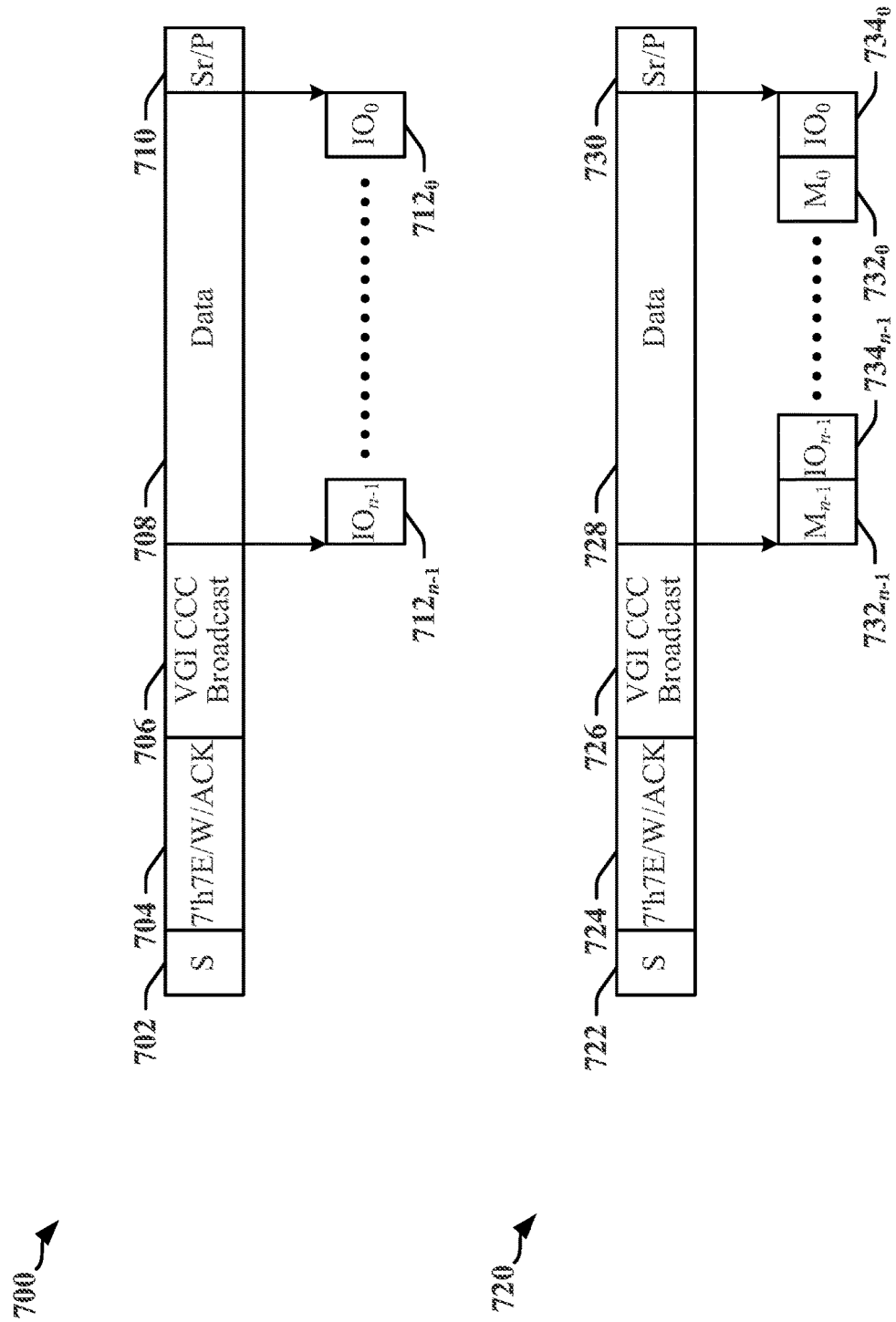
FIG. 7 illustrates examples of VGI broadcast frames according to certain aspects disclosed herein.

FIG. 7 illustrates examples of VGI broadcast frames 700, 720. In a first example, a broadcast frame 700 commences with a start bit 702 (S) followed by a header 704 in accordance with an I2C or I3C protocol. A VGI broadcast frame may be identified using a VGI broadcast common command code 706. A VGPIO data payload 708 includes a number (n) of virtual GPIO signals $712_0$-$712_{n-1}$, ranging from a first virtual GPIO signal $712_0$ to an nth virtual GPIO signal $712_{n-1}$. A VGI FSM may include a mapping table that maps bit positions of virtual GPIO signals in a VGPIO data payload 708 to conventional GPIO pins. The virtual nature of the signaling in the VGPIO data payload 708 can be transparent to processors in the transmitting and receiving devices.

In the second example, a masked VGI broadcast frame 720 may be transmitted by a host device to change the state of one or more GPIO pins without disturbing the state of other GPIO pins. In this example, the I/O signals for one or more devices are masked, while the I/O signals in a targeted device are unmasked. The masked VGI broadcast frame 720 commences with a start bit 722 followed by a header 724. A masked VGI broadcast frame 720 may be identified using a masked VGI broadcast common command code 726. The VGPIO data payload 728 may include I/O signal values $734_0$-$734_{n-1}$ and corresponding mask bits $732_0$-$732_{n-1}$, ranging from a first mask bit $M_0$ $732_0$ for the first I/O signal ($IO_0$) to an nth mask bit $M_{n-1}$ $732_{n-1}$ for the nth I/O signal $IO_{n-1}$.

A stop bit or synchronization bit (Sr/P 710, 730) terminates the broadcast frame 700, 720. A synchronization bit may be transmitted to indicate that an additional VGPIO payload is to be transmitted. In one example, the synchronization bit may be a repeated start bit in an I2C interface.

Figure 8:
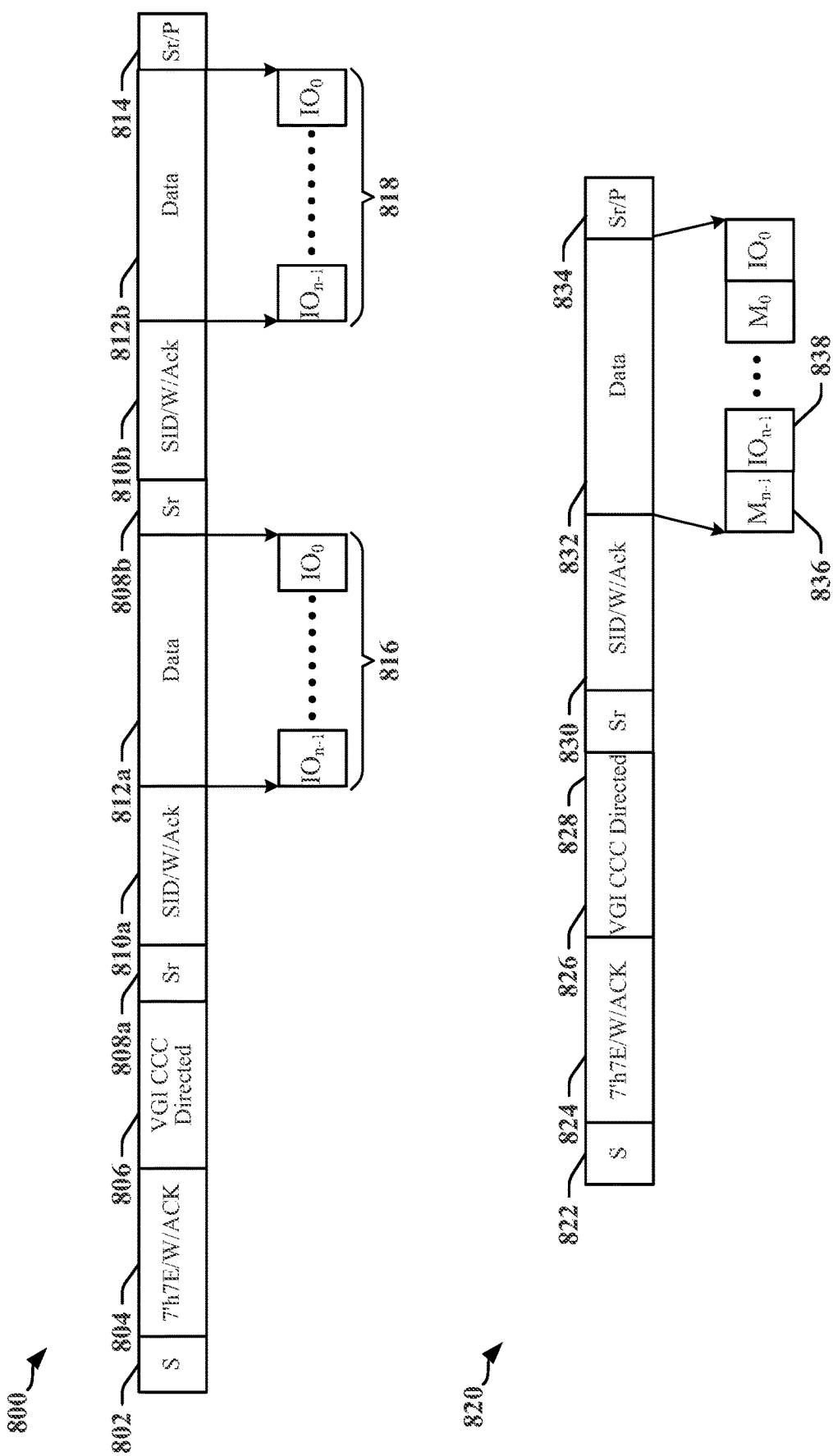
FIG. 8 illustrates examples of VGI directed frames according to certain aspects disclosed herein.

FIG. 8 illustrates examples of VGI directed frames 800, 820. In a first example, VGI directed frames 800 may be addressed to a single peripheral device or, in some instances, to a group of peripheral devices. The first of the VGI directed frames 800 commences with a start bit 802 (S) followed by a header 804 in accordance with an I2C or I3C protocol. A VGI directed frame 800 may be identified using a VGI directed common command code 806. The directed common command code 806 may be followed by a synchronization field 808a (Sr) and an address field 810a that includes a slave identifier to select the addressed device. The directed VGPIO data payload 812a that follows the address field 810a includes values 816 for a set of I/O signals that pertain to the addressed device. VGI directed frames 800 can include additional directed payloads 812b for additional devices. For example, the first directed VGPIO data payload 812a may be followed by a synchronization field 808b and a second address field 810b. In this example, the second directed VGPIO payload 812b includes values 818 for a set of I/O signals that pertain to a second addressed device. The use of VGI directed frames 800 may permit transmission of values for a subset or portion of the I/O signals carried in a broadcast VGPIO frame 700, 720.

In the second example, a masked VGI directed frame 820 may be transmitted by a host device to change the state of one or more GPIO pins without disturbing the state of other GPIO pins in a single peripheral device and without affecting other peripheral devices. In some examples, the I/O signals in one or more devices may be masked, while selected I/O signals in one or more targeted device are unmasked. The masked VGI directed frame 820 commences with a start bit 822 followed by a header 824. A masked VGI directed frame 820 may be identified using a masked VGI directed common command code 826. The masked VGI directed command code 826 may be followed by a synchronization field 828 (Sr) and an address field 830 that includes a slave identifier to select the addressed device. The directed payload 832 that follows includes VGPIO values for a set of I/O signals that pertain to the addressed device. For example, the VGPIO values in the directed data payload 832 may include I/O signal values 838 and corresponding mask bits 836.

A stop bit or synchronization bit (Sr/P 814, 834) terminates the VGI directed frames 800, 820. A synchronization bit may be transmitted to indicate that an additional VGPIO payload is to be transmitted. In one example, the synchronization bit may be a repeated start bit in an I2C interface.

Figure 9:
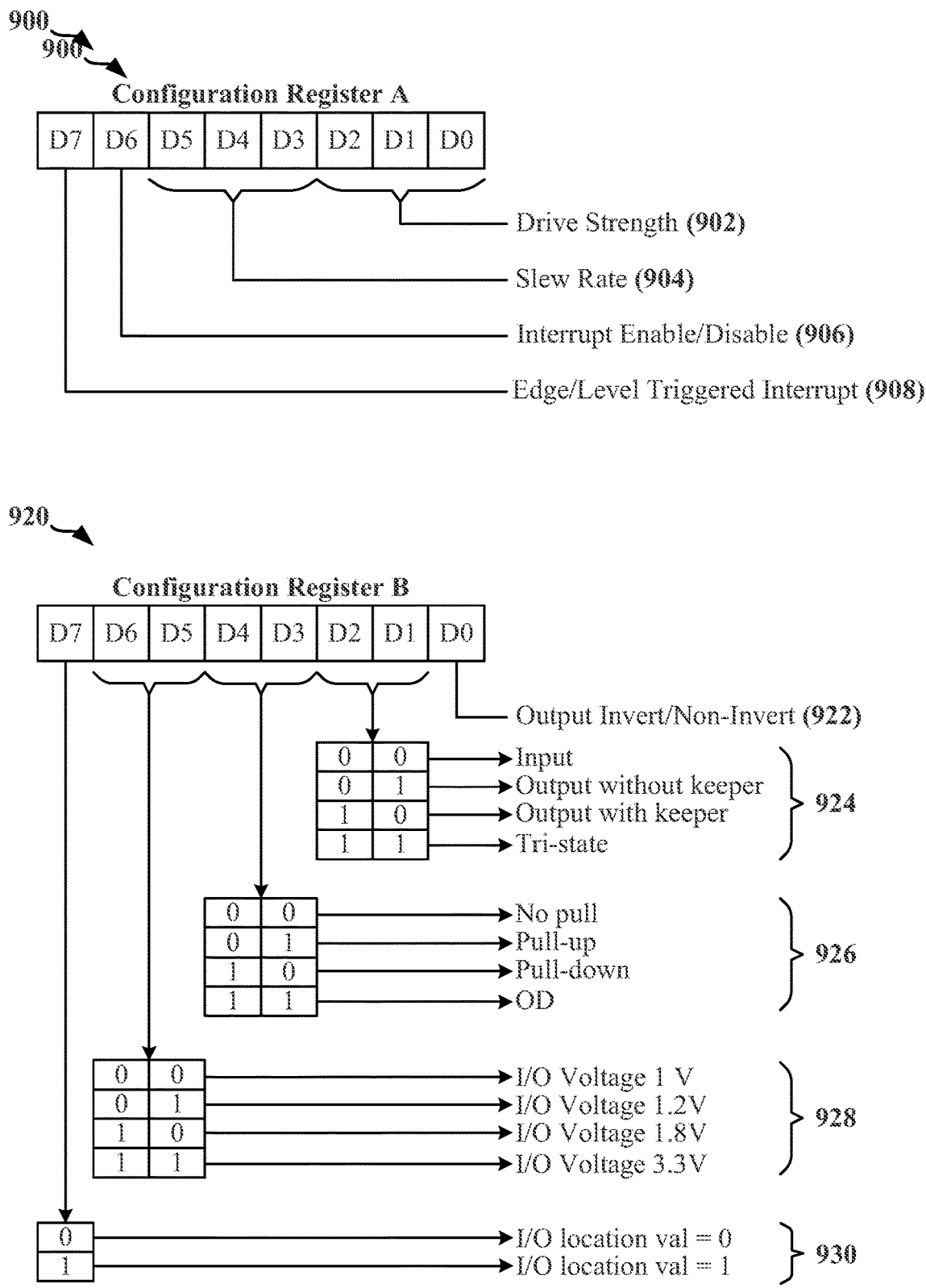
FIG. 9 illustrates configuration registers that may be associated with a physical pin according to certain aspects disclosed herein.

At the receiving device (e.g., the Application Processor 502 and/or peripheral device 504, 506, 508), received virtual GPIO signals are expanded into physical GPIO signal states presented on GPIO pins. The term "pin," as used herein, may refer to a physical structure such as a pad, pin or other interconnecting element used to couple an IC to a wire, trace, through-hole via, or other suitable physical connector provided on a circuit board, substrate or the like. Each GPIO pin may be associated with one or more configuration registers that store configuration parameters for the GPIO pin. FIG. 9 illustrates configuration registers 900 and 920 that may be associated with a physical pin. Each configuration register 900, 920 is implemented as a one-byte (8 bits) register, where different bits or groups of bits define a characteristic or other features that can be controlled through configuration. In a first example, bits D0-D2 902 control the drive strength for the GPIO pin, bits D3-D5 904 control the slew rate for GPIO pin, bit D6 906 enables interrupts, and bit D7 908 determines whether interrupts are edge-triggered or triggered by voltage-level. In a second example, bit D0 922 selects whether the GPIO pin receives an inverted or non-inverted signal, bits D1-D2 924 define a type of input or output pin, bits D3-D4 926 defines certain characteristics of an undriven pin, bits D5-D6 928 define voltage levels for signaling states, and bit D7 930 controls the binary value for the GPIO pin (i.e., whether GPIO pin carries carry a binary one or zero).

Consolidating GPIO for Multiple Devices or Communication Links

Figure 10:
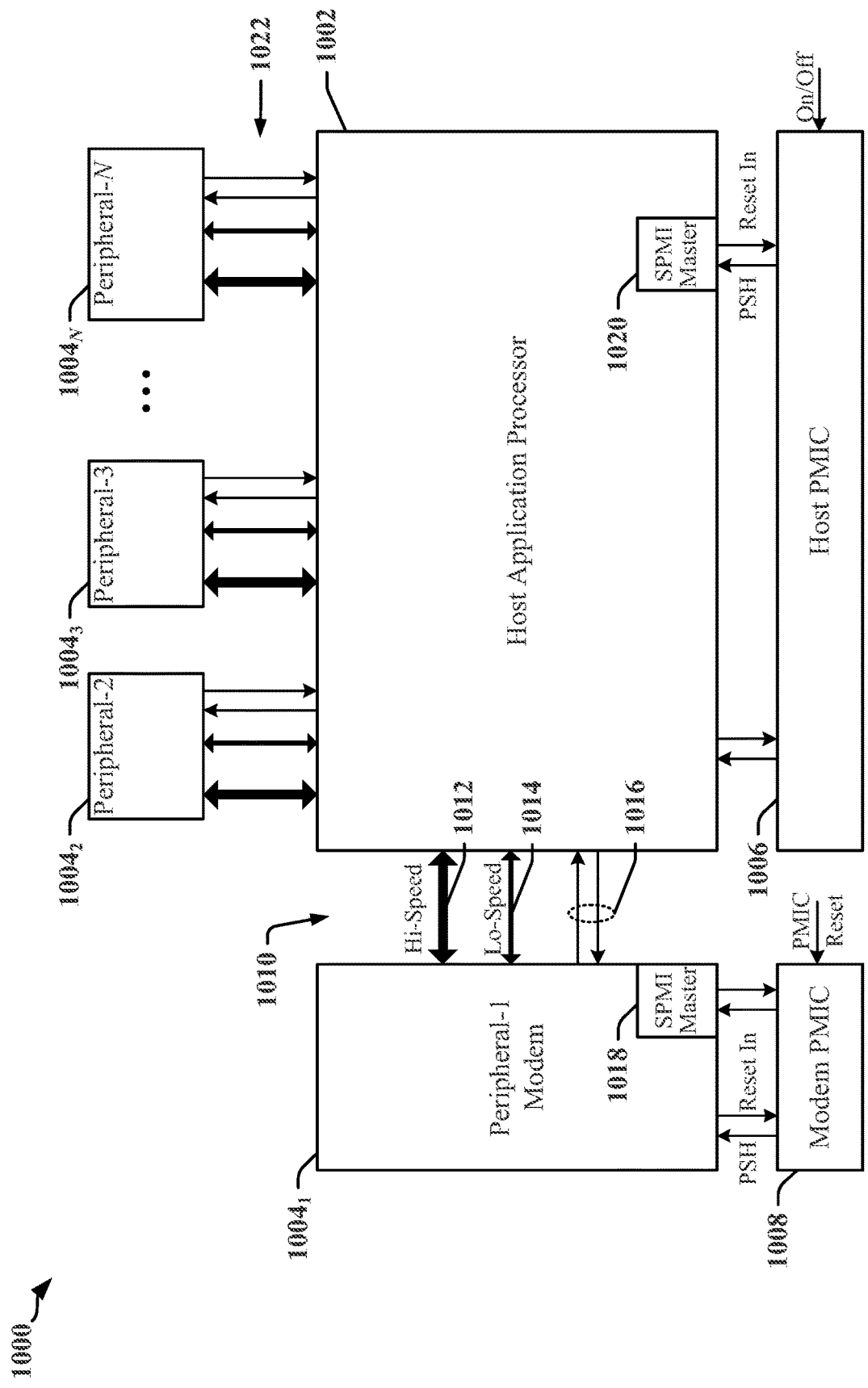
FIG. 10 illustrates an example of a system which includes one or more communication links that employ sideband GPIO.

FIG. 10 illustrates an example of a system 1000 which includes one or more communication links that employ sideband GPIO and that may not easily be serialized and transmitted in a single serial link In some examples, there may be an impediment to transmitting sideband GPIO over a single parallel data communication link. To facilitate description, the example of a serial data link may be employed, although the concepts described herein may be applied to parallel data communication links. The system 1000 may include an application processor 1002 that may serve as a host device on various communication links, multiple peripherals $1004_1$-$1004_N$, and one or more power management integrated circuits (PMICs 1006, 1008). In the illustrated system 1000, at least a first peripheral $1004_1$ may include a modem. The application processor 1002 and the first peripheral $1004_1$ may be coupled to respective PMICs 1006, 1008 using GPIO that provides a combination of reset and other signals, and a system power management interface (SPMI 1018, 1020). The SPMI 1018, 1020 operates as a serial interface defined by the MIPI Alliance that is optimized for the real-time control of devices including PMICs 1006, 1008. The SPMI 1018, 1020 may be configured as a shared bus that provides high-speed, low-latency connection for devices, where data transmissions may be managed, according to priorities assigned to different traffic classes.

The application processor 1002 may be coupled to each of the peripherals $1004_1$-$1004_N$ using multiple communication links 1012, 1014 and GPIO 1016. For example, the application processor 1002 may be coupled to the first peripheral $1004_1$ using a high-speed bus 1012, a low-speed bus 1014, and input and/or output GPIO 1016. As disclosed herein, GPIO signals may be virtualized and transferred over certain serial interfaces, such as the I3C interface. The transfer of the GPIO signals is facilitated using common command code protocols available in I3C interfaces that may not be available in other types of interface. Accordingly, the virtualization of GPIO may be rendered difficult or impractical when certain high speed communication links are used to couple the application processor 1002 and the peripherals 1004₁-1004ₙ.

Figure 11:
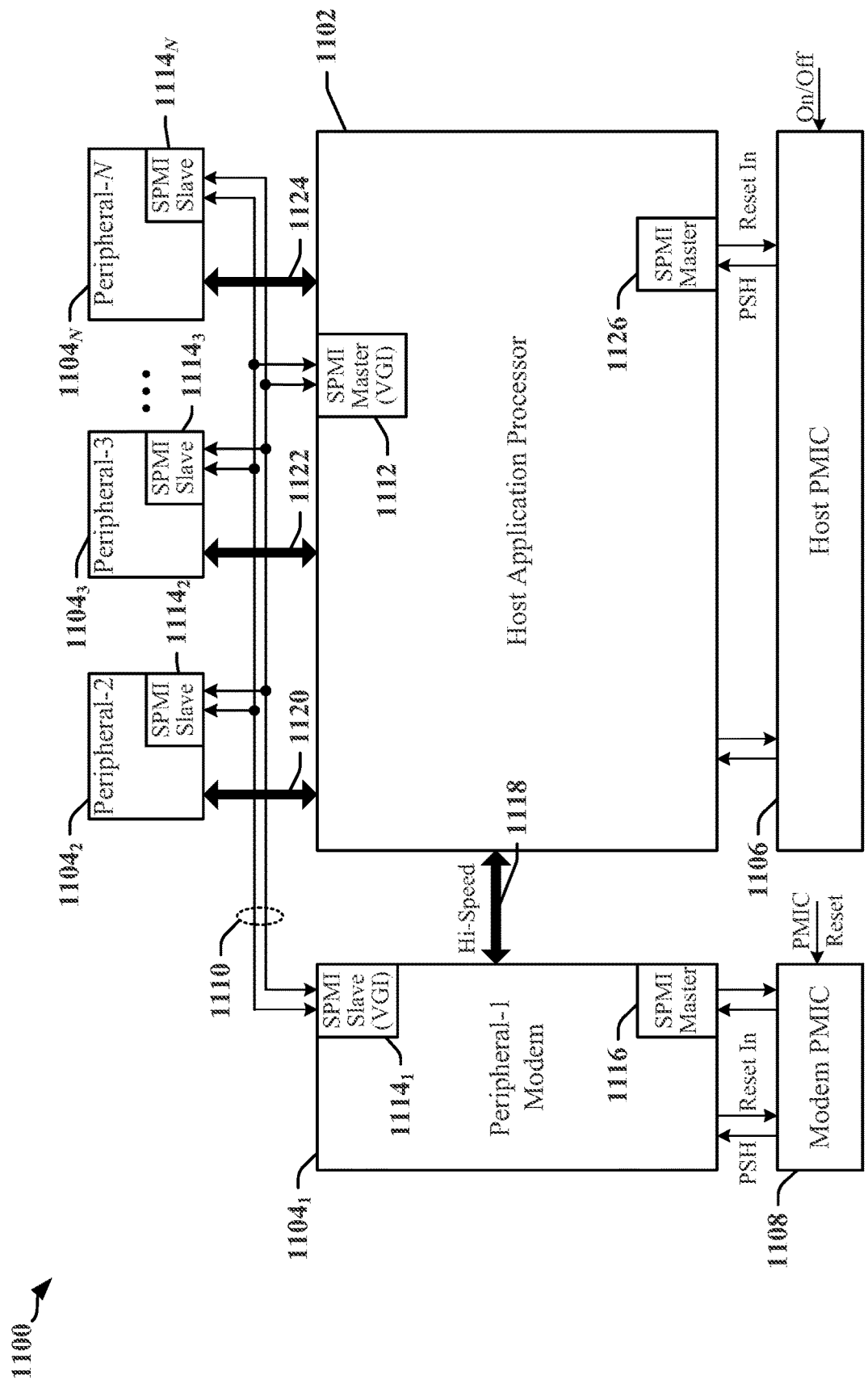
FIG. 11 illustrates an example of a system which virtualizes and consolidates communication of GPIO state associated with multiple devices and/or communication links using a single serial communication link in accordance with certain aspects disclosed herein.

According to certain aspects disclosed herein, GPIO may be consolidated for multiple communication links and devices. FIG. 11 illustrates an example of a system 1100 which virtualizes and consolidates communication of GPIO state associated with multiple devices and/or communication links using a single serial communication link. In the illustrated example, a multi-drop serial bus 1110 operated in accordance with SPMI protocols may be used to carry GPIO state information for multiple devices, including for example an application processor 1102 and multiple peripherals 1104₁-1104ₙ. State information for sideband GPIO associated with each high-speed serial link 1118, 1120, 1122, 1124 and other GPIO coupling the application processor 1102 to one or more of the peripherals 1104₁-1104ₙ may be transmitted as VGI over the serial bus 1110. In one example, the application processor 1102 may include an SPMI master 1112 and each of the peripherals 1104₁-1104ₙ may include SPMI slaves 1104₁-1104ₙ that may be used exclusively for exchange of VGI. In another example, the serial bus 1110 may be used for transferring data and commands unrelated to VGI, in addition to VGI.

The system 1100 may include an application processor 1102 that may serve as a host device on various communication links, including the serial bus 1110. One or more power management integrated circuits (PMICs 1106, 1108) may be included in the system 1100. In the illustrated system 1100, at least a first peripheral 1104₁ may include a modem.

Virtualizing GPIO can result in a reduced number of input/output pins, reduce IC package size, and reduces printed circuit board routing complexity. The serial bus 1110 may be operated in accordance with SPMI protocols. In some examples, other protocols may be used for transferring VGI at high speed, and with low latency. In one example the RFFE bus may be employed for communicating VGI. As disclosed herein, GPIO signals may be virtualized and transferred over the serial bus 1110. The transfer of the GPIO signals may be accomplished without modifying the protocols used on the serial bus 1110. In some examples, GPIO consolidation may be implemented using a state machine to control virtualization of GPIO. In many examples, no modification of communication protocol is required. For example, additions, modifications and/or deletions of protocol-defined command and/or common command codes are not required to control GPIO state transmission.

According to certain aspects, multiple GPIO ports can be virtualized such that the GPIO state information transmitted over the serial bus 1110 may relate to consolidated state for multiple GPIO ports. In one example, multiple GPIOs may be supported for each port. The state machine may be configured to automatically identify when GPIO state information should be transmitted, and to which devices 1102, 1104₁-1104ₙ the GPIO state information should be addressed. In some examples, state information related to one output GPIO may be transmitted and/or routed by the application processor 1102 (for example) to modify input GPIO of two or more of the peripherals 1104₁-1104ₙ.

In some instances, the state machine may be adapted to implement automatic bit-level masking to minimize software complexity and overhead and transmission latency. In some examples, a second level GPIO cross-bar multiplexer/demultiplexer scheme may be employed to enable routing to all possible routing destinations and combinations of routing destinations. GPIO state information may be transmitted to a targeted peripheral 1104₁-1104ₙ or to a group of peripherals 1104₁-1104ₙ. A configurable priority scheme may be implemented to select between GPIO state transmissions and messaging transmissions.

Examples of GPIO State Consolidation

Figure 12:
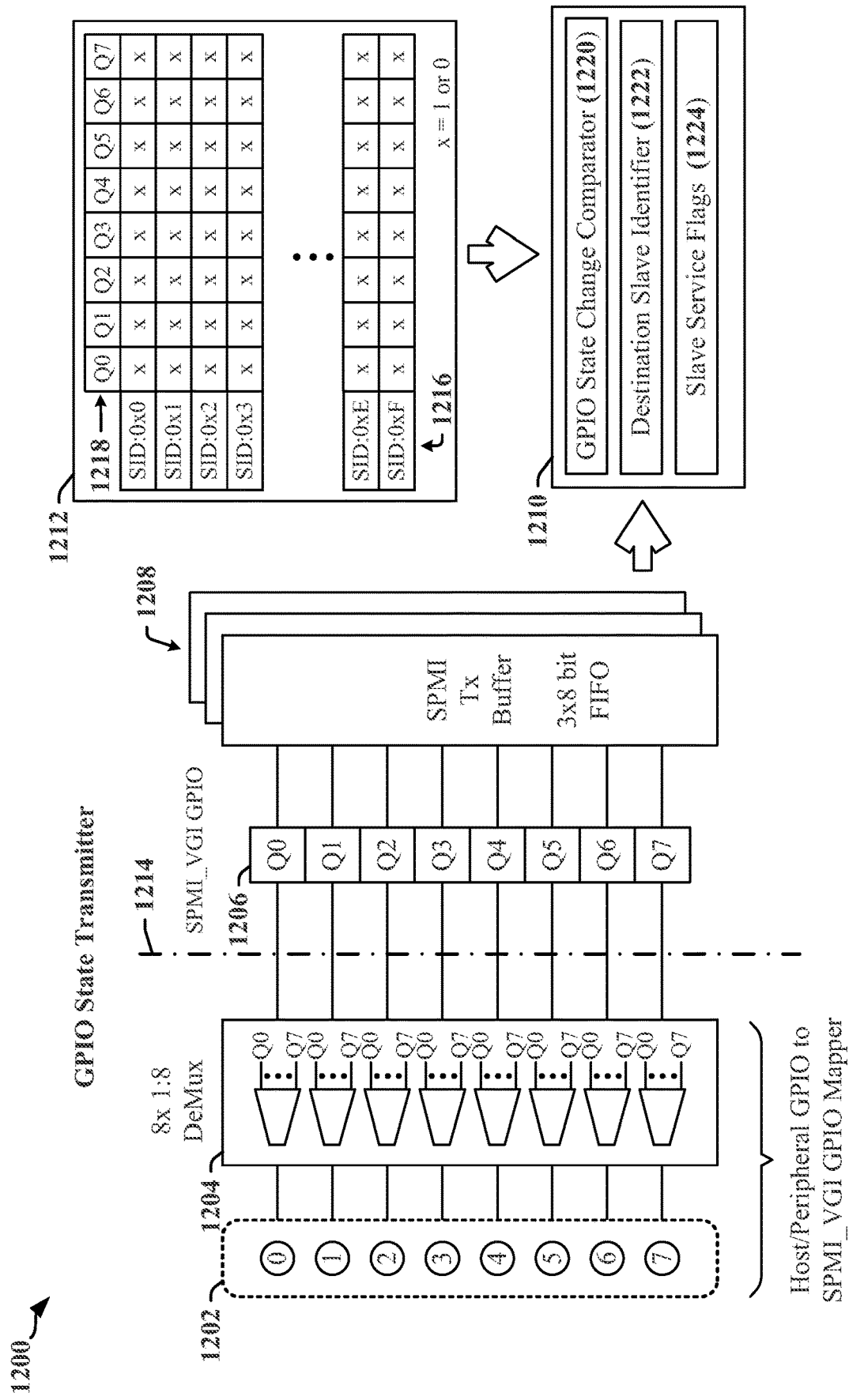
FIG. 12 is a flow diagram that illustrates operation of a GPIO state transmitter adapted in accordance with certain aspects disclosed herein.

FIG. 12 is a flow diagram 1200 that illustrates operation of a GPIO state transmitter. The flow diagram 1200 relates to an example of a host device that consolidates and transmits GPIO state information corresponding to a set of GPIOs. The set of GPIOs may include host or peripheral GPIOs 1202 which can be consolidated in SPMI_VGI GPIOs 1206. In some examples, these GPIOs 1202 are included in a unified GPIO map maintained by the host or peripheral device. Use of GPIOs 1202 derived from the unified GPIO map permits software transparency. In other words, the underlying software using these GPIOs 1202 does not require any change based on the usage of these GPIOs 1202 for generating SPMI_VGI GPIOs 1206.

Groups of 8 GPIOs 1202 may be consolidated for producing SPMI_VGI GPIOs 1206.

Each group of 8 GPIOs 1202 to be consolidated over SPMI_VGI GPIOs 1206 may configured using a 1-to-8 de-multiplexer 1204. The de-multiplexer 1204 enables mapping of the system or peripheral GPIOs to SPMI_VGI GPIOs 1206. All possible mappings of GPIOs to SPMI_VGI GPIOs 1206 are enabled by the de-multiplexer 1204. In one example, a 1:1 mapping may be used for host/peripheral GPIO to SPMI GPIO mapping. Each de-multiplexer 1204 may be controlled using 4 control bits, where 3 bits (e.g., bits [D2:D0]) configure the de-multiplexer 1204 and the fourth bit (e.g., bit D4) may be used to enable or disable the de-multiplexer 1204. SPMI_VGI GPIOs 1206 produced by the de-multiplexer 1204 represent the GPIO states that are transmitted in SPMI_VGI.

In some examples, soft GPIOs may be employed, where the configuration (Q0 to Q7) of SPMI_VGI GPIOs 1206 may be set programmatically. In this type implementation, host/peripheral GPIO 1202 and de-multiplexer 1204 blocks are not required. The dashed 1214 line illustrates a possible partitioning when the configuration of the SPMI_VGI GPIOs 1206 is set programmatically.

A transmit buffer 1208 may be used to store GPIO state changes while a previous state change is communicated. The transmit buffer 1208 may be implemented or configured to operate as a FIFO. In the illustrated example, the FIFO has a depth of at least three storage locations. The transmit buffer 1208 may be configured to accommodate any GPIO state changes that may occur happen previous state change information is in the transmit phase.

A slave association map 1212 may be provided. The slave association map 1212 may be indexed or ordered by slave identifier (SIDs 1216). The slave association map 1212 establishes the association of each available or possible slave with the output GPIO bits 1218. In one example, the slaves may include 16 slave devices having identifiers in the range SID=0x0 to SID=0xF. More than one slave may be associated with a given GPIO bit 1218, such that configurational equivalence of a single output GPIO bit 1218 connected to multiple peripherals may be provided as needed by a system design. In the example, each bit location can have the value '1' or '0' where '1' indicates an association between a SID 1216 and an output GPIO bit 1218, while a '0' indicates no association between a SID 1216 and an output GPIO bit 1218. In one example, a maximum of 16 slaves may be supported on the bus, and the slave association map 1212 requires 16-bytes of register space for each group of 8 output GPIO bits 1218. In other examples, the bus may support more than 16 slave devices, and the slave association map 1212 may be provisioned with register space sufficient to map the number of expected or possible slave devices.

In an example where the host is configured to support 16 slave devices and provide up to 16 bytes for configuring output GPIO bits 1218, the slave association map 1212 on the host side requires 16*16=256 bytes. Each slave, however, need support only 8 output GPIO bits and hence the slave association map on the slave side use only 16 bytes.

A transmit logic unit 1210 may be provided to send GPIO state information in accordance with standard SPMI protocols. The transmit logic unit 1210 may include certain modules and/or circuits including a GPIO state change comparator 1220, a destination slave identifier module 1222, and a slave service flags module 1224.

The GPIO state change comparator 1220 performs a bit level comparison between the last transmitted GPIO state and the GPIO state that is currently ready in the transmit buffer for transmission. A change at one or more bit location acts as trigger for GPIO state transmission.

The destination slave identifier module 1222 accesses the slave association map 1212 to determine which GPIO bits have changed, and to identify which slave or slaves are the destination for transmission of the GPIO state.

The slave service flags module 1224 may operate as a slave service tracker. When slaves have been identified by the destination slave identifier module 1222, corresponding flags are marked as active. The flags are cleared when all the slaves have been served.

Figure 13:
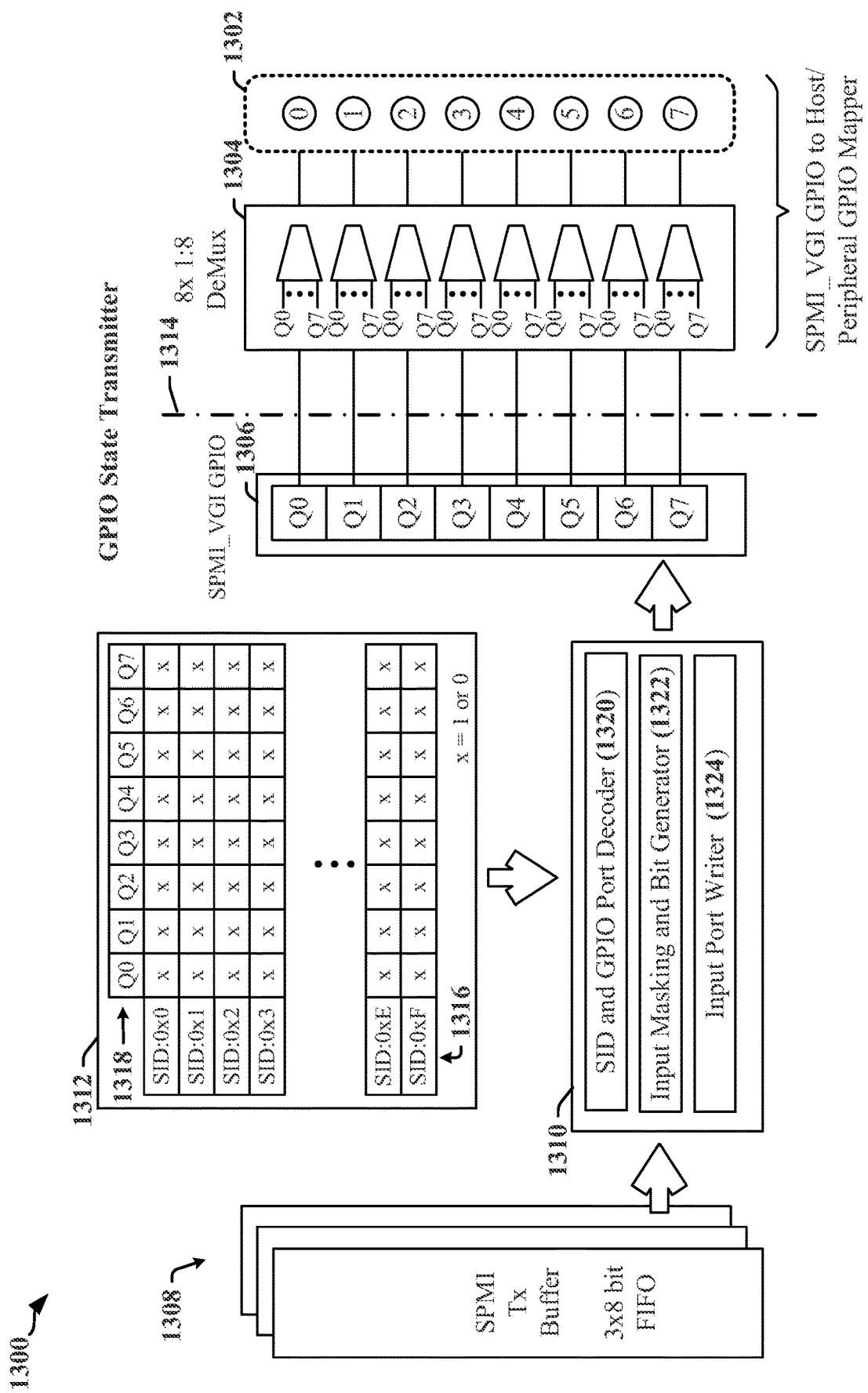
FIG. 13 is a flow diagram that illustrates operation of a GPIO state receiver adapted in accordance with certain aspects disclosed herein.

FIG. 13 is a flow diagram 1300 that illustrates operation of a GPIO state receiver. The flow diagram 1300 relates to an example of a slave device that receives GPIO state information corresponding to a set of GPIOs. The set of GPIOs may include host or peripheral GPIOs 1302. A receive buffer 1308 may be provided to receive data payloads received from the SPMI bus. The receive buffer 1308 may be organized as a FIFO that can handle a 16-byte space to accommodate the maximum data payload received from the SPMI bus. The depth of receive buffer 1308 may be three locations, although the depth may be selected according to implementation requirements and choices.

A slave association map 1312 may be maintained at the slave to process input GPIOs.

The slave association map 1312 may define an input GPIO mask to be applied to the incoming GPIOs for a particular slave and particular port of the slave. For example, a transmitting device may be configured to support a maximum number of 16 output GPIO ports, and a slave may be required to have a corresponding number (16) of association maps. Each association map relates to one of the ports, which may be in the enumerated port: #0 through port: # F. In order to accommodate all ports in this example, while maintaining association with all possible devices on the SPMI bus, each device requires 16*16=256 1-byte locations to store the I/P masks.

A receive logic unit 1310 may be provided to receive GPIO state information in accordance with standard SPMI protocols. The receive logic unit 1310 may include certain modules and/or circuits including an SID and GPIO Port Decoder 1320, an input masking and bit generator 1322, and an input port writer 1324.

The SID and GPIO Port Decoder 1320 may decode the SID and GPIO port number of the transmitting device, which is contained in the first byte of the payload. The SID may be mapped to four bits (e.g., [D7:D4]) and the GPIO port-number may be mapped to another four bits (e.g., [D3:D0]). The next byte of the payload includes the GPIO states. Based on the SID and GPIO port number, the receiving device may select an associated input mask to be applied to the received GPIO state byte.

The input masking and bit generator 1322 may be used to apply the mask to the payload. In one example, an input mask bit set to '1' implies that the corresponding GPIO bit is to be used. an input mask bit set to '0' implies that the corresponding GPIO bit is to be ignored.

The input port writer 1324 writes GPIO states to the SPMI_VGI GPIO port 1306. The SPMI_VGI GPIO port 1306 maintains the received GPIOs. A de-multiplexer 1304 is provided to enable routing flexibility for the received GPIOs.

At system start-up, the GPIO association maps 1212, 1312 and masking tables may be configured by the host processor. In some instances, the priority schemes may be dynamically configurable. Upon occurrence of a GPIO state change, a transmission may be initiated. Receiving peripherals respond to GPIOs as enabled in the previously set mask. In some implementations, the association maps 1212, 1312 and mask tables may be dynamically reconfigured.

SPMI RCS Master-Write/Read Payload Extension

Figure 14:
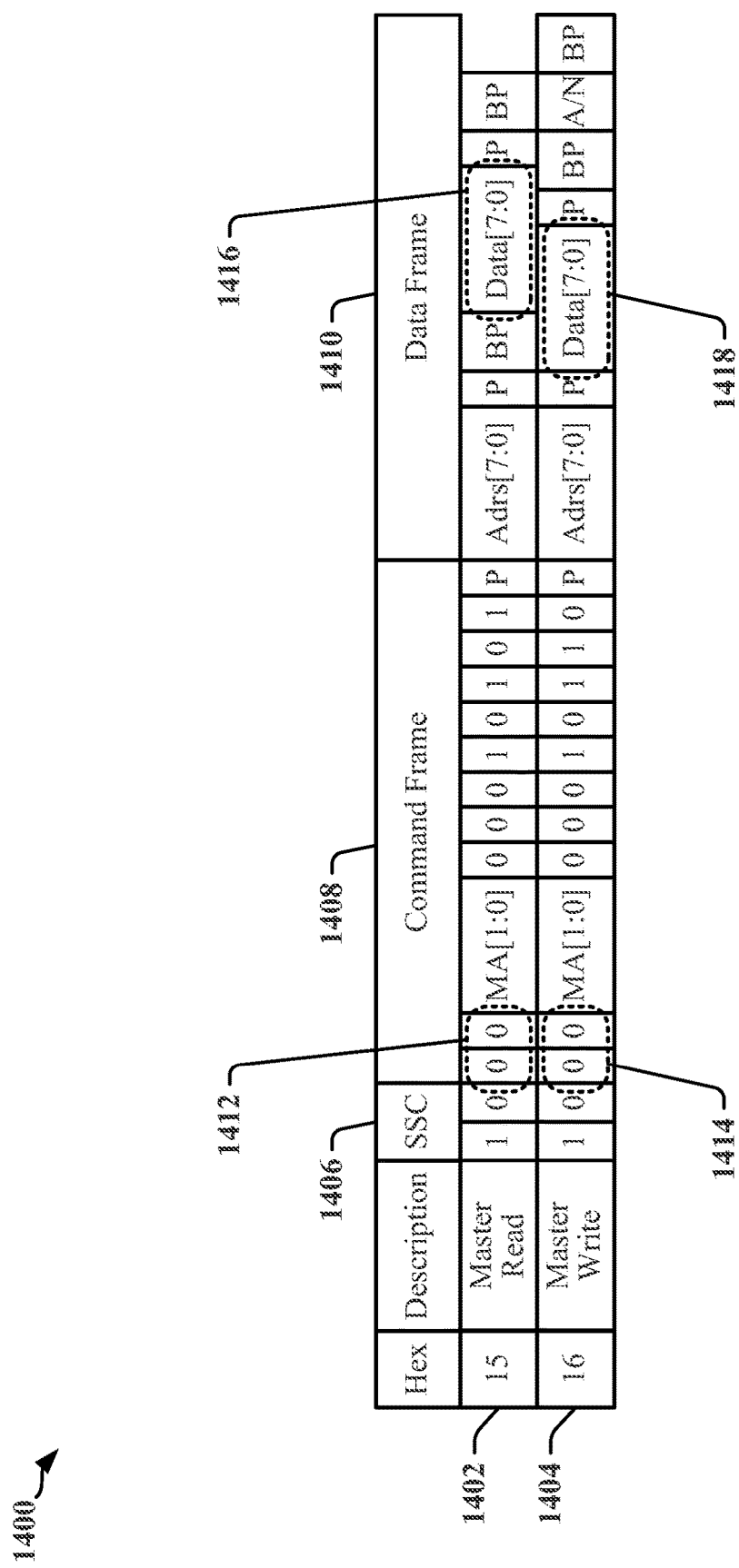
FIG. 14 is a diagram illustrating example datagrams used by the RCS to provoke the SPMI master to perform write/read operations.

According to certain aspects, SPMI protocols allow for a request-capable slave (RCS) to send write/read commands to a SPMI master upon winning bus arbitration. FIG. 14 is a diagram 1400 illustrating example datagrams used by the RCS to provoke the SPMI master to perform write/read operations. As shown, a master read datagram 1402 may be configured at hexadecimal location 15 of a register space and a master write datagram 1404 may be configured at hexadecimal location 16 of the register space. The master read datagram 1402 begins with a sequence start condition (SSC) 1406 including two bits 1, 0, followed by a command frame 1408 and a data frame 1410. The command frame 1408 for the master read datagram 1402 begins with a 4-bit address field. Notably, in some aspects, the first two bits 1412 (e.g., bits [3:2] containing 0, 0) of the 4-bit address field may not be used by the RCS when initiating the master read communication to the SPMI master. The second two bits (e.g., MA[1:0]) of the 4-bit address field may contain an SPMI master address. Following the SPMI master address is an 8-bit command code sequence including the eight bits 0, 0, 0, 1, 0, 1, 0, 1 that identifies the datagram 1402 as a master read command, followed by a parity bit P. The data frame 1410 for the master read datagram 1402 begins with an 8-bit register address sequence (Adrs[7:0]), followed by a parity bit P and a bus park (BP), which is then followed by an 8-bit data payload sequence (Data[7:0]) 1416, followed by a parity bit P and a bus park (BP).

The master write datagram 1402 begins with a sequence start condition (SSC) 1406 including two bits 1, 0, followed by a command frame 1408 and a data frame 1410. The command frame 1408 for the master write datagram 1404 begins with a 4-bit address field. In some aspects, the first two bits 1414 (e.g., bits [3:2] containing 0, 0) of the 4-bit address field may not be used by the RCS when initiating the master write communication to the SPMI master. The second two bits (e.g., MA[1:0]) of the 4-bit address field may contain an SPMI master address. Following the SPMI master address is an 8-bit command code sequence including the eight bits 0, 0, 0, 1, 0, 1, 1, 0 that identifies the datagram 1402 as a master write command, followed by a parity bit P. The data frame 1410 for the master write datagram 1404 begins with an 8-bit register address sequence (Adrs[7:0]), followed by a parity bit P, which is then followed by an 8-bit data payload sequence (Data[7:0]) 1418, a parity bit P, a bus park (BP), and ACK/NACK bit (A/N), and another bus park (BP).

According to certain aspects, the master read datagram 1402 may be limited to only one byte (8 bits) of data payload 1416 per datagram. Similarly, the master write datagram may be limited to only one byte (8 bits) of data payload 1418 per datagram. This may be problematic when the RCS wishes to send multiple bytes of data in connection with the master read datagram 1402 and/or the master write datagram 1404. For example, when the RCS intends to send one byte (or less) of data to the SPMI master, the RCS arbitrates for bus control in order to send one master read datagram 1402/master write datagram 1404 including the one byte (or less) of data payload 1416/1418. However, when the RCS intends to send multiple bytes of data to the SPMI master, the RCS has to send a separate read/write datagram for each byte of the multiple bytes of data payload, and further has to arbitrate/re-arbitrate for bus control prior to sending each datagram. Consequently, such approach causes unwanted latency.

For certain applications, such as an application integrating VGI and SPMI (SPMI_VGI), the RCS may need to provoke a write/read operation for multiple bytes of data (e.g., up to 4 bytes of data) using a single datagram. However, this may not be possible using the SPMI architecture described above. Accordingly, the present disclosure provides a novel approach that allows multiple bytes of data to be written or read using a single datagram (e.g., master read datagram or master write datagram) sent from the RCS to the SPMI master. The novel approach eliminates the need to send multiple datagrams, and therefore, reduces latency.

Figure 15:
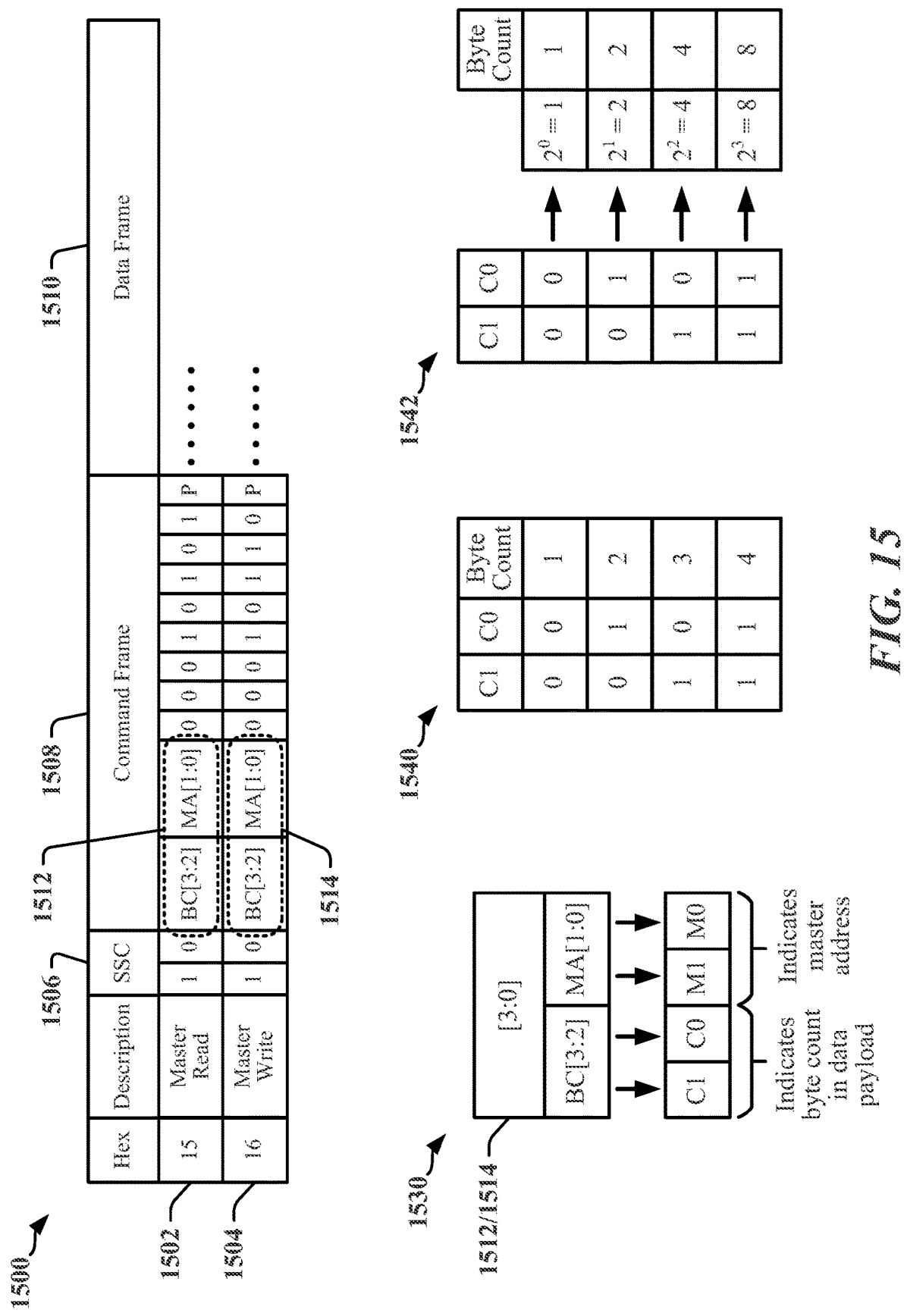
FIG. 15 illustrates example datagrams used by the RCS to provoke the SPMI master to perform write/read operations according to certain aspects of the disclosure.

FIG. 15 illustrates example datagrams 1500 used by the RCS to provoke the SPMI master to perform write/read operations according to certain aspects of the disclosure. As shown, a master read datagram 1502 may be configured at hexadecimal location 15 of the register space and a master write datagram 1504 may be configured at hexadecimal location 16 of the register space. Both the master read datagram 1502 and the master write datagram 1504 begin with a sequence start condition (SSC) 1506 including two bits 1, 0, followed by a command frame 1508 and a data frame 1510.

The command frame 1508 for the master read datagram 1502 begins with a 4-bit address field 1512. Similarly, the command frame 1508 for the master write datagram 1504 begins with a 4-bit address field 1514. In accordance with the present disclosure, the 4-bit address field 1512 and the 4-bit address field 1514 may be repurposed (e.g., selectively or dynamically repurposed via the communication of a configuration message) to indicate a number of bytes of data payload in the data frame 1510. For example, the first two bits of each 4-bit address field 1512, 1514 (denoted as BC[3:2]) may be repurposed to indicate to the SPMI master a number of bytes (byte count) of data payload in the data frame 1510 to be read or written. Referring to diagram 1530 detailing the 4-bit address field 1512/1514, the first two bits BC[3:2] contain the bits C1 and C0. C1 and C0 may be assigned different values to indicate the number of bytes (byte count) of data payload in the data frame 1510. The last two bits (denoted as MA[1:0]) contain the bits M1 and M0. M1 and M0 may be assigned different values to indicate a particular SPMI master address.

Examples of different values assigned to C1 and C0 for indicating the byte count are shown in diagram 1540. In an aspect of the disclosure, a weighted binary coded decimal value of C1 and C0 yields the byte count. For example, if the binary coded decimal value of C1 and C0 is M, where M is an integer greater than or equal to 0 and less than or equal to 3, then the byte count is given by M+1. Accordingly, when C1 has a value of 0 and C0 has a value of 0, a binary coded decimal value M of C1 and C0 is given by: $M=(0\times2^1)+(0\times2^0)=0+0=0$, and therefore, the byte count is given by: $M+1=0+1=1$, and one byte of data payload is indicated to be read or written to the SPMI master. When C1 has a value of 0 and C0 has a value of 1, a binary coded decimal value M of C1 and C0 is given by: $M=(0\times2^1)+(1\times2^0)=0+1=1$, and therefore, the byte count is given by: $M+1=1+1=2$, and two bytes of data payload are indicated to be read or written to the SPMI master. When C1 has a value of 1 and C0 has a value of 0, a binary coded decimal value M of C1 and C0 is given by: $M=(1\times2^1)+(0\times2^0)=2+0=2$, and therefore, the byte count is given by: $M+1=2+1=3$, and three bytes of data payload are indicated to be read or written to the SPMI master. When C1 has a value of 1 and C0 has a value of 1, a binary coded decimal value M of C1 and C0 is given by: $M=(1\times2^1)+(1\times2^0)=2+1=3$, and therefore, the byte count is given by: $M+1=3+1=4$, and four bytes of data payload are indicated to be read or written to the SPMI master.

In another aspect of the disclosure, a load-exponent mode may be enabled to support the indication of up to 8 bytes of data payload to be read or written. The load-exponent mode may be defined/enabled via the communication (reception/transmission) of a configuration register message (e.g., load-exponent-enable register message). Referring to diagram 1542, a binary coded decimal value of C1 and C0 is used as an exponent to the base of 2 to determine the byte count. For example, if the binary coded decimal value of C1 and C0 is N, where N is an integer greater than or equal to 0 and less than or equal to 3, then the byte count is given by $2^N$. Accordingly, when C1 has a value of 0 and C0 has a value of 0, a binary coded decimal value N of C1 and C0 is given by: $N=(0\times2^1)+(0\times2^0)=0+0=0$, and therefore, the byte count is given by: $2^N=2^0=1$. When C1 has a value of 0 and C0 has a value of 1, a binary coded decimal value N of C1 and C0 is given by: $N=(0\times2^1)+(1\times2^0)=0+1=1$, and therefore, the byte count is given by: $2^N=2^1=2$. When C1 has a value of 1 and C0 has a value of 0, a binary coded decimal value of C1 and C0 is given by: $N=(1\times2^1)+(0\times2^0)=2+0=2$, and therefore, the byte count is given by: $2^N=2^2=4$. When C1 has a value of 1 and C0 has a value of 1, a binary coded decimal value N of C1 and C0 is given by: $(1\times2^1)+(1\times2^0)=2+1=3$, and therefore, the byte count is given by: $2^N=2^3=8$.

FIG. 16 is a table 1600 summarizing the number of bytes of data payload capable of being indicated to the SPMI master based on the bit configurations of BC[3:2] in the 4-bit address field 1512/1514 of FIG. 15. As shown, if the load-exponent mode is disabled for an RCS to Master write command, when BC[3:2]=[0,0], the number of bytes of data payload indicated to be written is 1, when BC[3:2]=[0,1], the number of bytes of data payload indicated to be written is 2, when BC[3:2]=[1,0], the number of bytes of data payload indicated to be written is 3, and when BC[3:2]=[1,1], the number of bytes of data payload indicated to be written is 4. If the load-exponent mode is enabled for an RCS to Master write command, when BC[3:2]=[0,0], the number of bytes of data payload indicated to be written is 1, when BC[3:2]

=[0,1], the number of bytes of data payload indicated to be written is 2, when BC[3:2]=[1,0], the number of bytes of data payload indicated to be written is 4, and when BC[3:2]=[1,1], the number of bytes of data payload indicated to be written is 8.

As shown further in table 1600, if the load-exponent mode is disabled for an RCS to Master read command, when BC[3:2]=[0,0], the number of bytes of data payload indicated to be read is 1, when BC[3:2]=[0,1], the number of bytes of data payload indicated to be read is 2, when BC[3:2]=[1,0], the number of bytes of data payload indicated to be read is 3, and when BC[3:2]=[1,1], the number of bytes of data payload indicated to be read is 4. If the load-exponent mode is enabled for an RCS to Master read command, when BC[3:2]=[0,0], the number of bytes of data payload indicated to be read is 1, when BC[3:2]=[0,1], the number of bytes of data payload indicated to be read is 2, when BC[3:2]=[1,0], the number of bytes of data payload indicated to be read is 4, and when BC[3:2]=[1,1], the number of bytes of data payload indicated to be read is 8.

In an aspect of the disclosure, a polarity of the bit configurations of BC[3:2] in the 4-bit address field 1512/1514 of FIG. 15 may be reversed to indicate the number of bytes of data payload to the SPMI master. As such, if the load-exponent mode is disabled for an RCS to Master write/Master read command, when BC[3:2]=[0,0], the number of bytes of data payload indicated to be written/read may be 4, when BC[3:2]=[0,1], the number of bytes of data payload indicated to be written/read may be 3, when BC[3:2]=[1,0], the number of bytes of data payload indicated to be written/read may be 2, and when BC[3:2]=[1,1], the number of bytes of data payload indicated to be written/read may be 1. If the load-exponent mode is enabled for an RCS to Master write/Master read command, when BC[3:2]=[0,0], the number of bytes of data payload indicated to be written/read may be 8, when BC[3:2]=[0,1], the number of bytes of data payload indicated to be written/read may be 4, when BC[3:2]=[1,0], the number of bytes of data payload indicated to be written/read may be 2, and when BC[3:2]=[1,1], the number of bytes of data payload indicated to be written/read may be 1.

Figure 17:
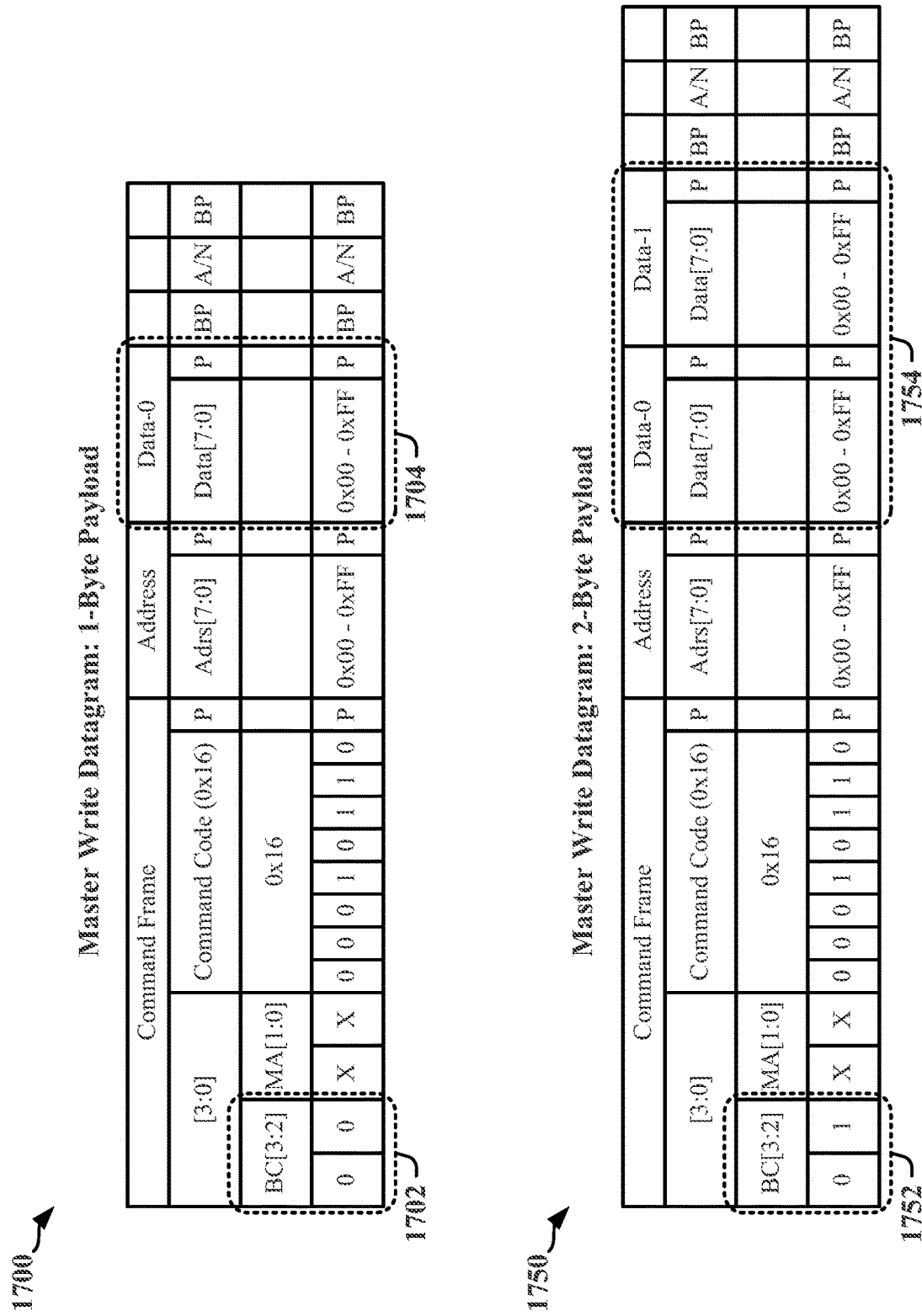
FIG. 17 illustrates example master write datagrams indicating one byte or two bytes of data payload to be written.

FIG. 17 illustrates an example master write datagram 1700 indicating one byte of data payload to be written. The master write datagram 1700 includes at least a command frame, a register address field, and a data payload. The first two bits of the 4-bit address field in the command frame (BC[3:2]) 1702 may indicate to the SPMI master a number of bytes (byte count) of data in the payload to be written. As an example, when the BC[3:2] field 1702 contains the bit values [0,0], this indicates that one byte of data (Data-0) is present in the payload 1704. Accordingly, the SPMI master receiving the master write datagram 1700 will be made aware of the one byte of data (Data-0) in the payload 1704 based on the bit values [0,0] present in the BC[3:2] field 1702. The payload 1704 may be followed by a bus park (BP), and ACK/NACK bit (A/N), and another bus park (BP).

FIG. 17 further illustrates an example master write datagram 1750 indicating two bytes of data payload to be written. The master write datagram 1750 includes at least a command frame, a register address field, and a data payload. The first two bits of the 4-bit address field in the command frame (BC[3:2]) 1752 may indicate to the SPMI master a number of bytes (byte count) of data in the payload to be written. As an example, when the BC[3:2] field 1752 contains the bit values [0,1], this indicates that two bytes of data (Data-0 and Data-1) are present in the payload 1754. Accordingly, the SPMI master receiving the master write datagram 1750 will be made aware of the two bytes of data (Data-0 and Data-1) in the payload 1754 based on the bit values [0,1] present in the BC[3:2] field 1752. The payload 1754 may be followed by a bus park (BP), and ACK/NACK bit (A/N), and another bus park (BP).

Figure 18:
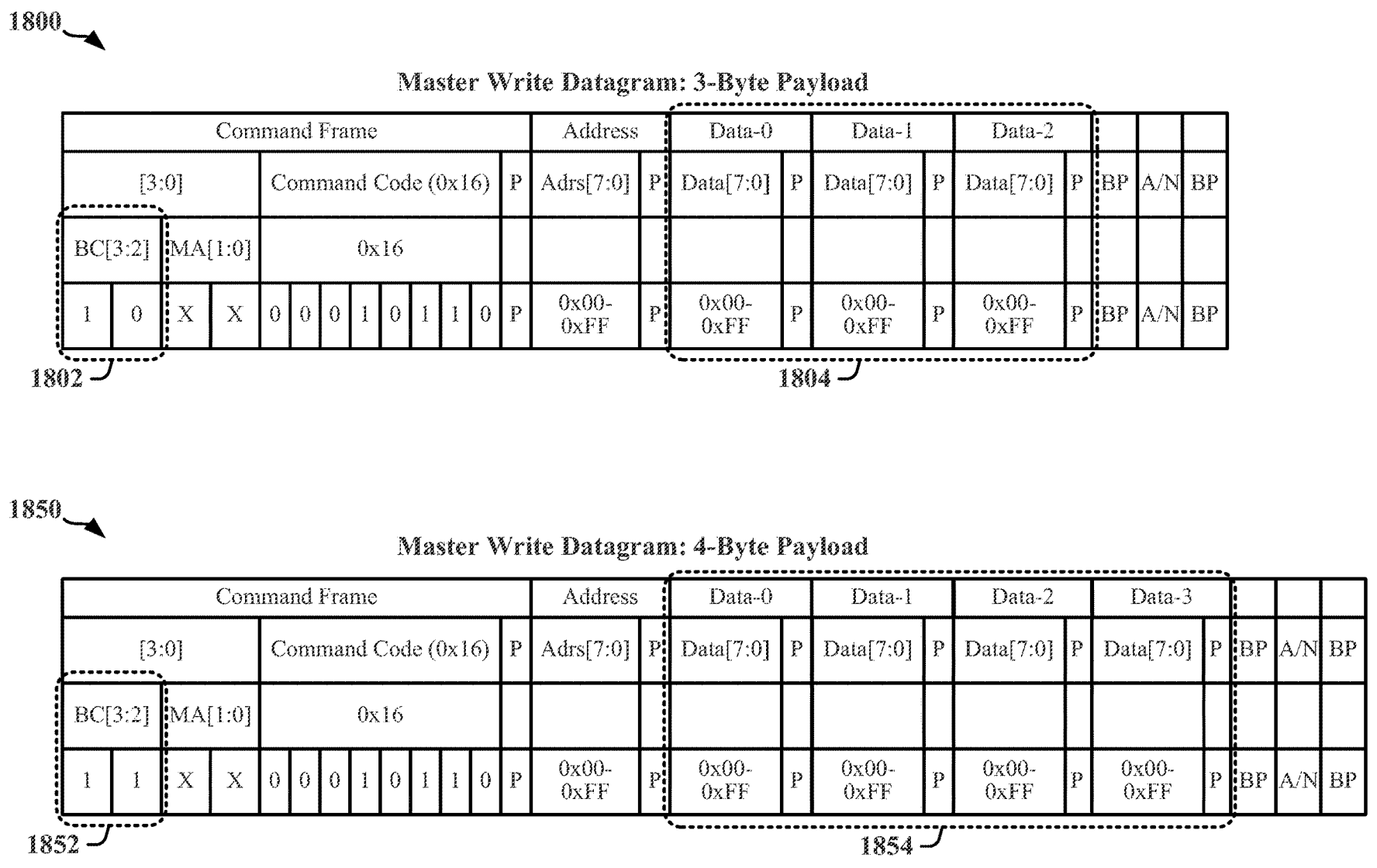

FIG. 18 illustrates an example master write datagram 1800 indicating three bytes of data payload to be written. The master write datagram 1800 includes at least a command frame, a register address field, and a data payload. The first two bits of the 4-bit address field in the command frame (BC[3:2]) 1802 may indicate to the SPMI master a number of bytes (byte count) of data in the payload to be written. As an example, when the BC[3:2] field 1802 contains the bit values [1,0], this indicates that three bytes of data (Data-0, Data-1, and Data-2) are present in the payload 1804. Accordingly, the SPMI master receiving the master write datagram 1800 will be made aware of the three bytes of data (Data-0, Data-1, and Data-2) in the payload 1804 based on the bit values [1,0] present in the BC[3:2] field 1802. The payload 1804 may be followed by a bus park (BP), and ACK/NACK bit (A/N), and another bus park (BP).

FIG. 18 further illustrates an example master write datagram 1850 indicating four bytes of data payload to be written. The master write datagram 1850 includes at least a command frame, a register address field, and a data payload. The first two bits of the 4-bit address field in the command frame (BC[3:2]) 1852 may indicate to the SPMI master a number of bytes (byte count) of data in the payload to be written. As an example, when the BC[3:2] field 1852 contains the bit values [1,1], this indicates that four bytes of data (Data-0, Data-1, Data-2, and Data-3) are present in the payload 1854. Accordingly, the SPMI master receiving the master write datagram 1850 will be made aware of the four bytes of data (Data-0, Data-1, Data-2, and Data-3) in the payload 1854 based on the bit values [1,1] present in the BC[3:2] field 1852. The payload 1854 may be followed by a bus park (BP), and ACK/NACK bit (A/N), and another bus park (BP).

Figure 19:
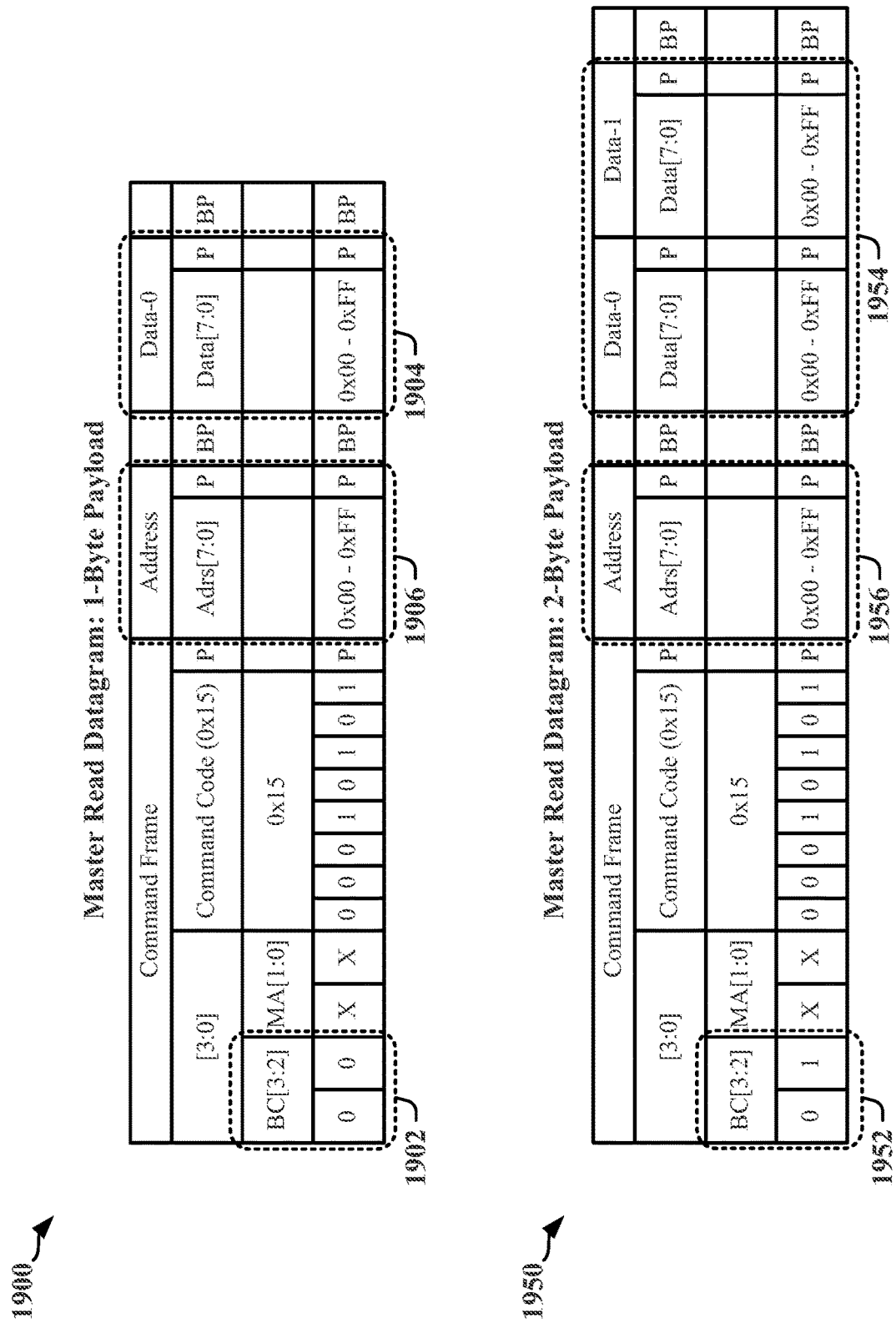
FIG. 19 illustrates example master read datagrams indicating one byte or two bytes of data payload to be read.

FIG. 19 illustrates an example master read datagram 1900 indicating one byte of data payload to be read. The master read datagram 1900 includes at least a command frame, a register address field, and a data payload. The first two bits of the 4-bit address field in the command frame (BC[3:2]) 1902 may indicate to the SPMI master a number of bytes (byte count) of data in the payload to be read. As an example, when the BC[3:2] field 1902 contains the bit values [0,0], this indicates that one byte of data (Data-0) is present in the payload 1904. Accordingly, the SPMI master receiving the master read datagram 1900 will be made aware of the one byte of data (Data-0) in the payload 1904 based on the bit values [0,0] present in the BC[3:2] field 1902. The register address field 1906 may be followed by a bus park (BP). The payload 1904 may also be followed by a bus park (BP).

FIG. 19 further illustrates an example master read datagram 1950 indicating two bytes of data payload to be read. The master read datagram 1950 includes at least a command frame, a register address field, and a data payload. The first two bits of the 4-bit address field in the command frame (BC[3:2]) 1952 may indicate to the SPMI master a number of bytes (byte count) of data in the payload to be read. As an example, when the BC[3:2] field 1952 contains the bit values [0,1], this indicates that two bytes of data (Data-0 and Data-1) are present in the payload 1954. Accordingly, the SPMI master receiving the master read datagram 1950 will be made aware of the two bytes of data (Data-0 and Data-1) in the payload 1954 based on the bit values [0,1] present in the BC[3:2] field 1952. The register address field 1956 may be followed by a bus park (BP). The payload 1954 may also be followed by a bus park (BP). According to other aspects, although not shown, a bus park (BP) may also be located between the Data-0 and Data-1 fields.

FIG. 20 illustrates an example master read datagram 2000 indicating three bytes of data payload to be read. The master read datagram 2000 includes at least a command frame, a register address field, and a data payload. The first two bits of the 4-bit address field in the command frame (BC[3:2]) 2002 may indicate to the SPMI master a number of bytes (byte count) of data in the payload to be read. As an example, when the BC[3:2] field 2002 contains the bit values [1,0], this indicates that three bytes of data (Data-0, Data-1, and Data-2) are present in the payload 2004. Accordingly, the SPMI master receiving the master read datagram 2000 will be made aware of the three bytes of data (Data-0, Data-1, and Data-2) in the payload 2004 based on the bit values [1,0] present in the BC[3:2] field 2002. The register address field 2006 may be followed by a bus park (BP). The payload 2004 may also be followed by a bus park (BP). According to other aspects, although not shown, a bus park (BP) may also be located between the Data-0 and Data-1 fields and between the Data-1 and Data-2 fields.

FIG. 20 further illustrates an example master read datagram 2050 indicating four bytes of data payload to be read. The master read datagram 2050 includes at least a command frame, a register address field, and a data payload. The first two bits of the 4-bit address field in the command frame (BC[3:2]) 2052 may indicate to the SPMI master a number of bytes (byte count) of data in the payload to be read. As an example, when the BC[3:2] field 2052 contains the bit values [1,1], this indicates that four bytes of data (Data-0, Data-1, Data-2, and Data-3) are present in the payload 2054. Accordingly, the SPMI master receiving the master read datagram 2050 will be made aware of the four bytes of data (Data-0, Data-1, Data-2, and Data-3) in the payload 2054 based on the bit values [1,1] present in the BC[3:2] field 2052. The register address field 2056 may be followed by a bus park (BP). The payload 2054 may also be followed by a bus park (BP). According to other aspects, although not shown, a bus park (BP) may also be located between the Data-0 and Data-1 fields, between the Data-1 and Data-2 fields, and between the Data-2 and Data-3 fields.

Figure 21:
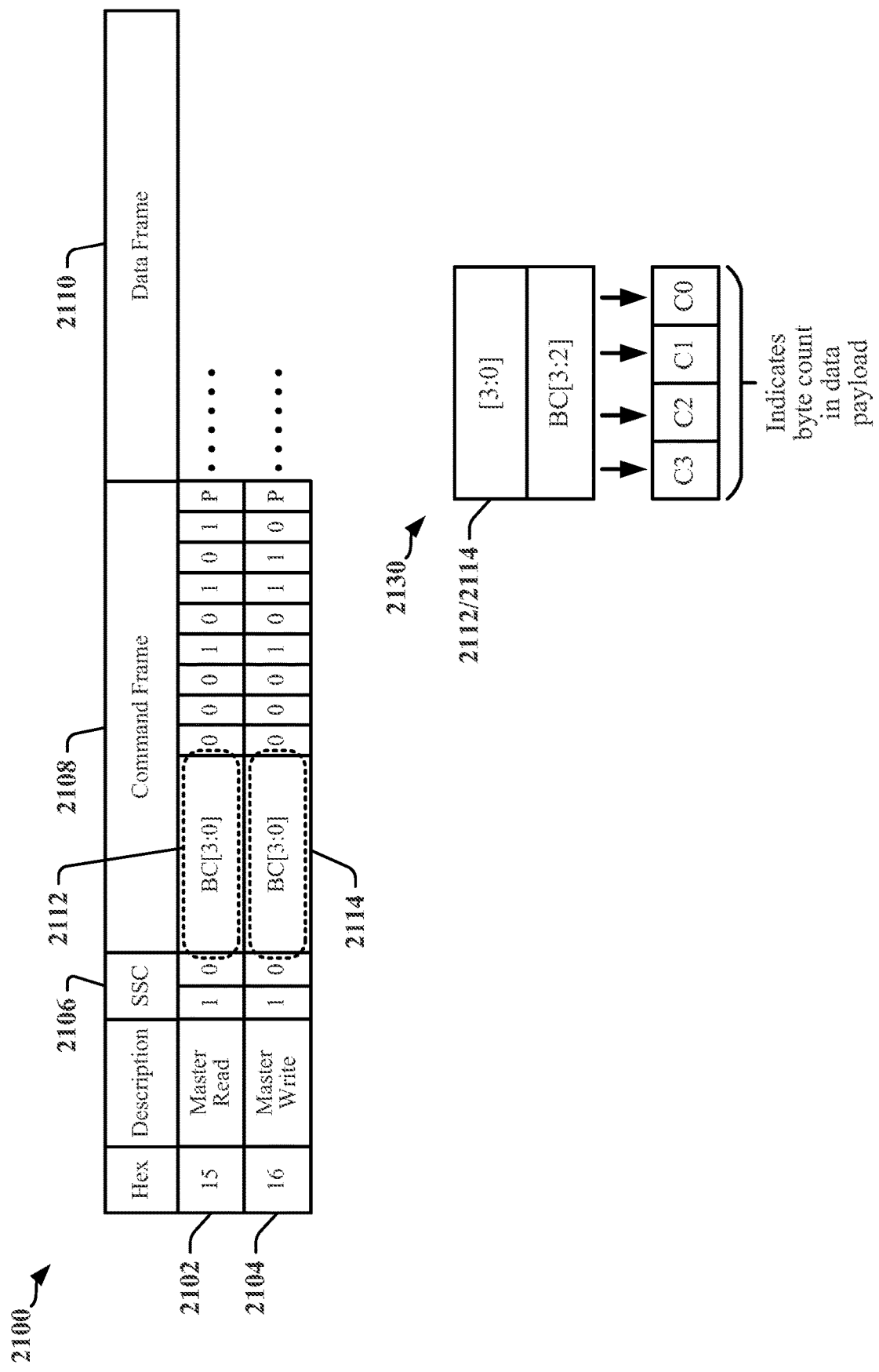
FIG. 21 illustrates other example datagrams used by the RCS to provoke the SPMI master to perform write/read operations according to certain aspects of the disclosure.

FIG. 21 illustrates other example datagrams 2100 used by the RCS to provoke the SPMI master to perform write/read operations according to certain aspects of the disclosure. Similar to the master read/master write datagrams described above with respect to FIG. 15, a master read datagram 2102 may be configured at hexadecimal location 15 of the register space and a master write datagram 2104 may be configured at hexadecimal location 16 of the register space. Both the master read datagram 2102 and the master write datagram 2104 begin with a sequence start condition (SSC) 2106 including two bits 1, 0, followed by a command frame 2108 and a data frame 2110.

The command frame 2108 for the master read datagram 2102 begins with an address field 2112. Similarly, the command frame 2108 for the master write datagram 2104 begins with an address field 2114. In an aspect of the present disclosure, a various number of bits of an address field may be used to indicate a number of bytes (byte count) of data payload in the data frame 2110 to be read or written. For example, four bits of each address field 2112, 2114 (denoted as BC[3:0]) may indicate to the SPMI master the number of bytes in the data frame 2110 to be read or written. Referring to diagram 2130 detailing the address field 2112/2114, the four bits BC[3:0] contain the bits C3, C2, C1, and C0. C3, C2, C1, and C0 may be assigned different values to indicate the number of bytes (byte count) of data payload in the data frame 2110.

FIG. 22 illustrates an example table 2200 of different bit values of an address field (e.g., C3, C2, C1, and C0) for indicating a byte count in a data frame (e.g., data frame 2110 of FIG. 21) according to certain aspects of the disclosure. In an aspect, a weighted binary coded decimal value of C3, C2, C1, and C0 yields the byte count.

For example, if the binary coded decimal value of C3, C2, C1, and C0 is P, where P is an integer greater than or equal to 0 and less than or equal to 15, then the byte count is given by P+1. In an example 2202, when C3 has a value of 0, C2 has a value of 0, C1 has a value of 0, and C0 has a value of 0, a binary coded decimal value P of C3, C2, C1, and C0 is given by: $P=(0 \times 2^3)+(0 \times 2^2)+(0 \times 2^1)+(0 \times 2^0)=0+0+0+0=0$, and therefore, the byte count is given by: P+1=0+1=1, and one byte of data payload is indicated to be read or written to the SPMI master. In another example 2204, when C3 has a value of 1, C2 has a value of 0, C1 has a value of 1, and C0 has a value of 1, a binary coded decimal value P of C3, C2, C1, and C0 is given by: $P=(1 \times 2^3)+(0 \times 2^2)+(1 \times 2^1)+(1 \times 2^0)=8+0+2+1=11$, and therefore, the byte count is given by: P+1=11+1=12, and 12 bytes of data payload is indicated to be read or written to the SPMI master.

Figure 23:
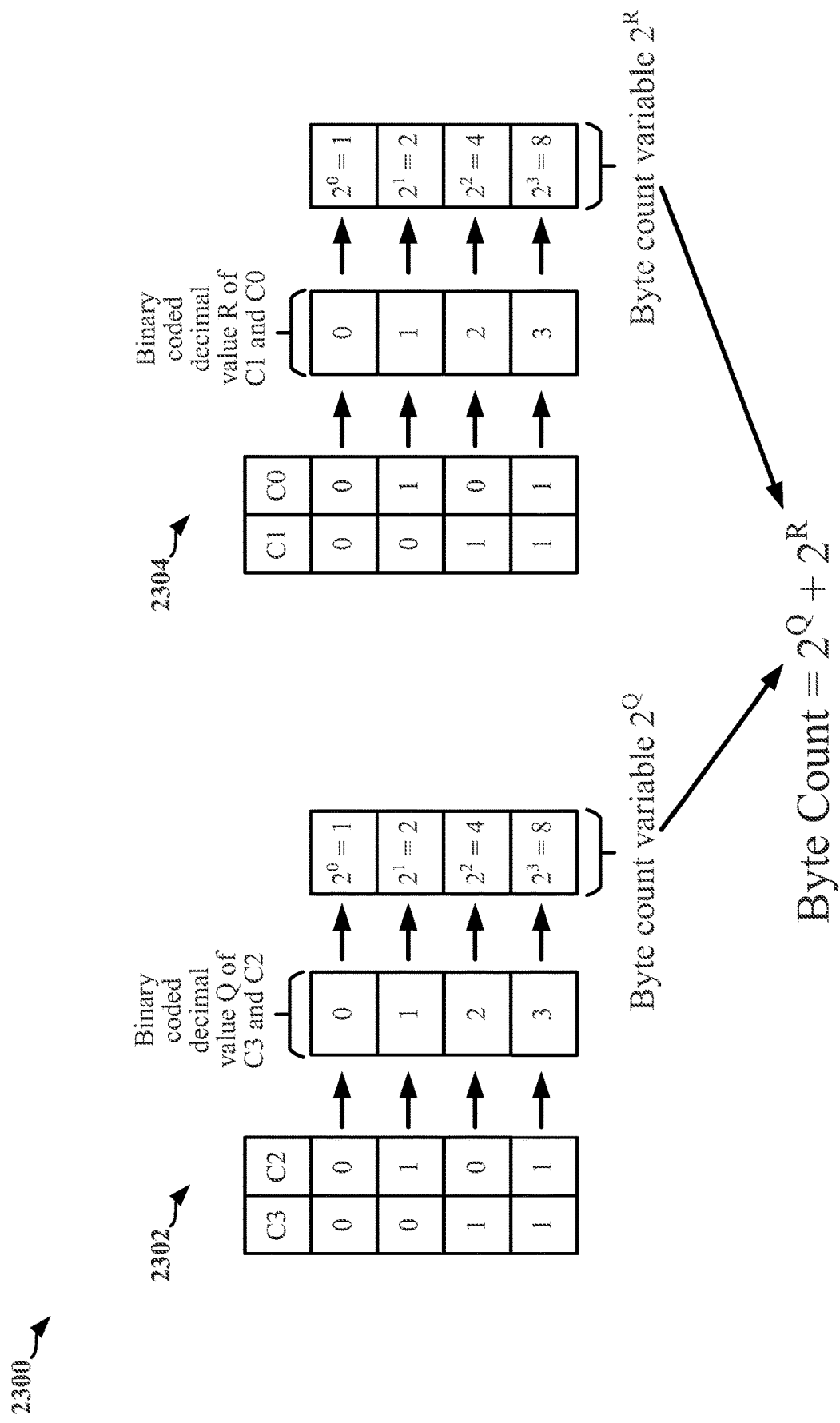
FIG. 23 is a diagram illustrating the application of a load-exponent mode to different bit values of an address field for indicating a byte count in a data frame according to certain aspects of the disclosure.

FIG. 23 is a diagram 2300 illustrating the application of a load-exponent mode to different bit values of an address field (e.g., C3, C2, C1, and C0) for indicating a byte count in a data frame (e.g., data frame 2110 of FIG. 21) according to certain aspects of the disclosure. In an aspect, the load-exponent mode may be enabled to support the indication of up to 16 bytes of data payload to be read or written. The load-exponent mode may be defined/enabled via the communication (reception/transmission) of a configuration register message (e.g., load-exponent-enable register message).

In an aspect, a binary coded decimal value of C3 and C2 is used as an exponent to the base of 2 to determine a first byte count variable, and a binary coded decimal value of C1 and C0 is used as an exponent to the base of 2 to determine a second byte count variable. Moreover, the byte count may be the sum of the first byte count variable and the second byte count variable.

For example, referring to a first diagram 2302 applying the load-exponent mode to address field bits C3 and C2, if the binary coded decimal value of C3 and C2 is Q, where Q is an integer greater than or equal to 0 and less than or equal to 3, then a first byte count variable is given by $2^Q$. Accordingly, when C3 has a value of 0 and C2 has a value of 0, a binary coded decimal value Q of C3 and C2 is given by: $Q=(0 \times 2^1)+(0 \times 2^0)=0+0=0$, and therefore, the first byte count variable is given by: $2^Q=2^0=1$. When C3 has a value of 0 and C2 has a value of 1, a binary coded decimal value Q of C3 and C2 is given by: $Q=(0 \times 2^1)+(1 \times 2^0)=0+1=1$, and therefore, the first byte count variable is given by: $2^Q=2^1=2$. When C3 has a value of 1 and C2 has a value of 0, a binary coded decimal value of C3 and C2 is given by: $Q=(1 \times 2^1)+(0 \times 2^0)=2+0=2$, and therefore, the first byte count variable is given by: $2^Q=2^2=4$. When C3 has a value of 1 and C2 has a value of 1, a binary coded decimal value Q of C3 and C2 is given by: $(1 \times 2^1)+(1 \times 2^0)=2+1=3$, and therefore, the first byte count variable is given by: $2^Q=2^3=8$.

Referring to a second diagram 2304 applying the load-exponent mode to address field bits C1 and C0, if the binary coded decimal value of C1 and C0 is R, where R is an integer greater than or equal to 0 and less than or equal to 3, then a second byte count variable is given by $2^R$. Accordingly, when C1 has a value of 0 and C0 has a value of 0, a binary coded decimal value R of C1 and C0 is given by: $R=(0\times2^1)+(0\times2^0)=0+0=0$, and therefore, the second byte count variable is given by: $2^R=2^0=1$. When C1 has a value of 0 and C0 has a value of 1, a binary coded decimal value R of C1 and C0 is given by: $R=(0\times2^1)+(1\times2^0)=0+1=1$, and therefore, the second byte count variable is given by: $2^R=2^1=2$. When C1 has a value of 1 and C0 has a value of 0, a binary coded decimal value of C1 and C0 is given by: $R=(1\times2^1)+(0\times2^0)=2+0=2$, and therefore, the second byte count variable is given by: $2^R=2^2=4$. When C1 has a value of 1 and C0 has a value of 1, a binary coded decimal value R of C1 and C0 is given by: $(1\times2^1)+(1\times2^0)=2+1=3$, and therefore, the second byte count variable is given by: $2^R=2^3=8$.

Moreover, as stated above, the byte count may be the sum of the first byte count variable ($2^Q$) and the second byte count variable ($2^R$). Therefore, the byte count may be given by: Byte Count=$2^Q+2^R$.

Examples of Methods and Processing Circuits

Figure 24:
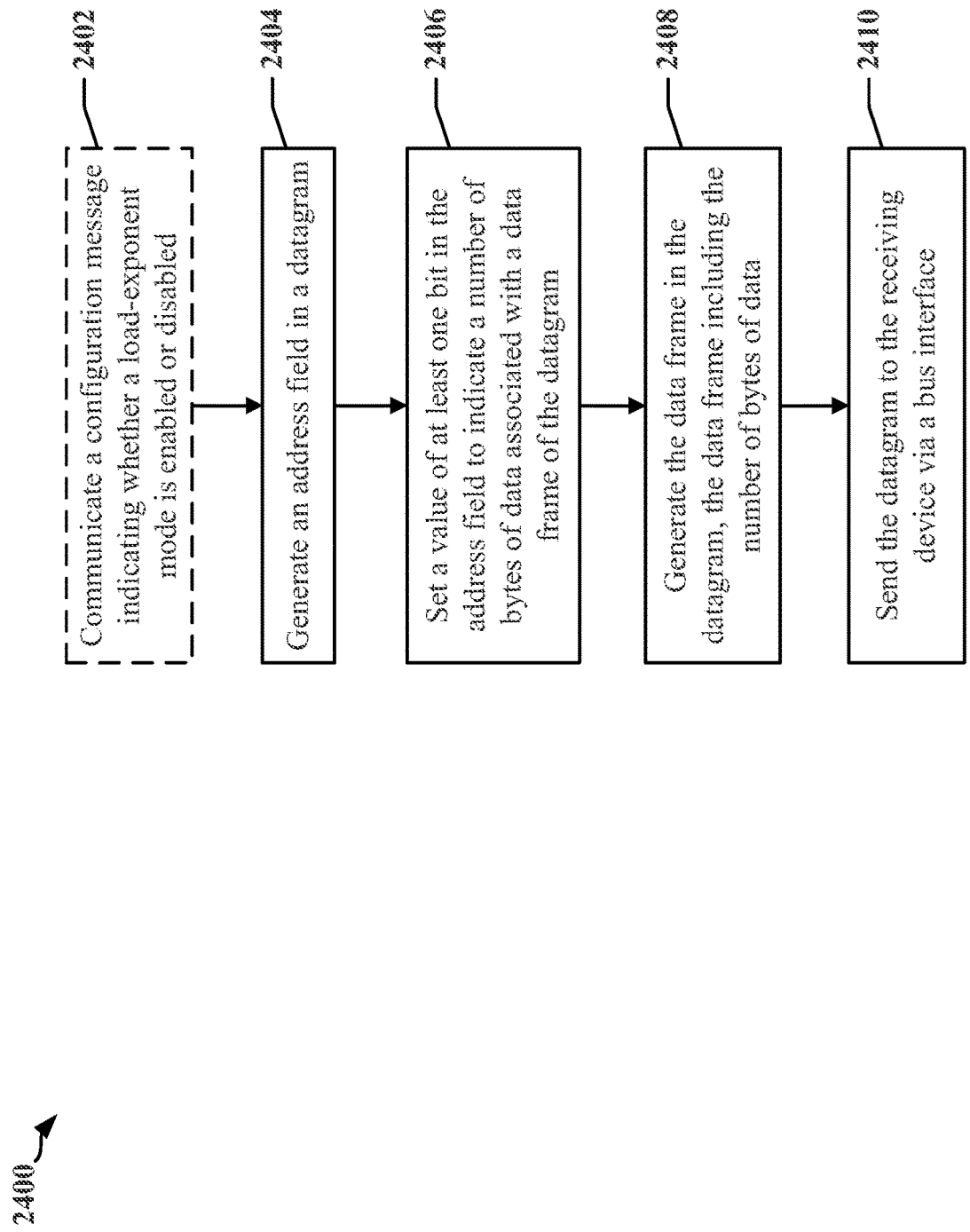
FIG. 24 is a first flowchart illustrating certain operations of an application processor adapted in accordance with certain aspects disclosed herein.

FIG. 24 is a flowchart 2400 of a method that may be performed at a transmitting device (e.g., request-capable slave (RCS)) for sending a datagram to a receiving device (e.g., SPMI master). In an aspect, the transmitting device is the RCS and the datagram is sent across a system power management interface (SPMI) bus. The datagram may be a master read datagram provoking the receiving device to perform a read operation with respect to data included in a data frame of the datagram. Alternatively, the datagram may be a master write datagram provoking the receiving device to perform a write operation with respect to the data included in the data frame.

At block 2402, the transmitting device may optionally communicate (receive or transmit) a configuration message indicating whether a load-exponent mode is enabled or disabled.

At block 2404, the transmitting device may generate an address field in a datagram. At block 2406, the transmitting device may set a value of at least one bit in the address field to indicate a number of bytes of data associated with a data frame of the datagram. In an aspect, a first portion of the address field includes the at least one bit indicating the number of bytes of data associated with the data frame, and a second portion of the address field includes at least one other bit corresponding to an address of the receiving device.

In an aspect, when setting the value of the at least one bit in the address field, the transmitting device may detect the number of bytes of data associated with the data frame, detect whether a load-exponent mode is enabled or disabled, and set at least a first bit value and a second bit value in the address field according to the detected number of bytes of data and whether the load-exponent mode is enabled or disabled. In an example, when the load-exponent mode is disabled, the detected number of bytes of data is equal to M+1, where M is an integer greater than or equal to 0 and less than or equal to 3 ($0\leq M\leq3$), and the first bit value and the second bit value are set such that a binary coded decimal value of the first bit value and the second bit value is equal to M. In another example, when the load-exponent mode is enabled, the detected number of bytes of data is equal to $2^N$, where N is an integer greater than or equal to 0 and less than or equal to 3 ($0\leq N\leq3$), and the first bit value and the second bit value are set such that a binary coded decimal value of the first bit value and the second bit value is equal to N. Moreover, when generating the address field, the transmitting device may set bit values of other bits (e.g., a third bit value and a fourth bit value) in the address field corresponding to an address of the receiving device.

In a further aspect, when setting the value of the at least one bit in the address field, the transmitting device may further set a third bit value and a fourth bit value in the address field according to the detected number of bytes of data and whether the load-exponent mode is enabled or disabled. In an example, when the load-exponent mode is disabled, the detected number of bytes of data is equal to P+1, where P is an integer greater than or equal to 0 and less than or equal to 15 ($0\leq P\leq15$). Accordingly, the first bit value, the second bit value, the third bit value, and the fourth bit value may be set such that a binary coded decimal value of the first bit value, the second bit value, the third bit value, and the fourth bit value is equal to P.

In another example, when the load-exponent mode is enabled, the detected number of bytes of data is equal to $2^Q+2^R$, where Q is an integer greater than or equal to 0 and less than or equal to 3 ($0\leq Q\leq3$) and R is an integer greater than or equal to 0 and less than or equal to 3 ($0\leq R\leq3$). Accordingly, the first bit value and the second bit value may be set such that a binary coded decimal value of the first bit value and the second bit value is equal to Q, and the third bit value and the fourth bit value may be set such that a binary coded decimal value of the third bit value and the fourth bit value is equal to R.

At block 2408, the transmitting device generates the data frame in the datagram. The data frame includes the number of bytes of data indicated by the value of the at least one bit in the address field. In an example, when generating the data frame, the transmitting device may provide a bus park (BP) at an end of the number of bytes of data in the data frame. In another example, when generating the data frame, the transmitting device may provide a bus park (BP) between each byte of data of the number of bytes of data in the data frame.

At block 2410, the transmitting device sends the datagram to the receiving device via a bus interface. The datagram may be sent to the receiving device independent of software involvement after initialization. In some implementations, the datagram may be sent to the receiving device in accordance with a standards-defined protocol that controls transmissions over a shared communication link. For example, the shared communication link may include a serial bus operated in accordance with an I3C, RFFE, SPMI or other protocol defined by the MIPI Alliance.

Figure 25:
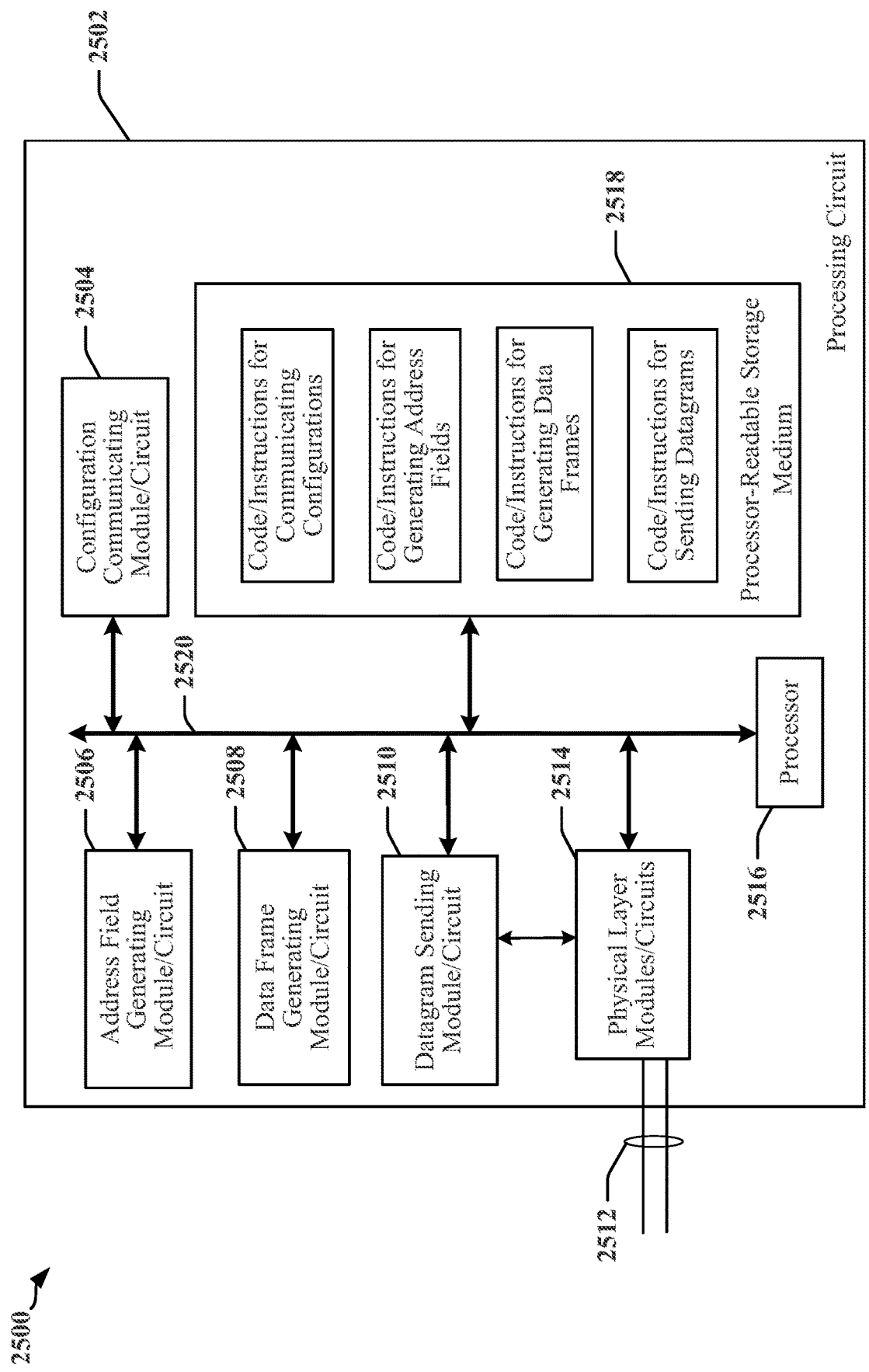
FIG. 25 illustrates a first example of a hardware implementation for an apparatus adapted in accordance with certain aspects disclosed herein.

FIG. 25 is a diagram illustrating a simplified example of a hardware implementation for an apparatus 2500 employing a processing circuit 2502. The apparatus may implement a bridging circuit in accordance with certain aspects disclosed herein. The processing circuit typically has a controller or processor 2516 that may include one or more microprocessors, microcontrollers, digital signal processors, sequencers and/or state machines. The processing circuit 2502 may be implemented with a bus architecture, represented generally by the bus 2520. The bus 2520 may include any number of interconnecting buses and bridges depending on the specific application of the processing circuit 2502 and the overall design constraints. The bus 2520 links together various circuits including one or more processors and/or hardware modules, represented by the controller or processor 2516, the modules and/or circuits 2504, 2506, 2508, and 2510 and the processor-readable storage medium 2518. One or more physical layer circuits and/or modules 2514 may be provided to support communications over a communication link implemented using a multi-wire bus 2512 or other communication structure. The bus 2520 may also link vari- ous other circuits such as timing sources, peripherals, voltage regulators, and power management circuits, which are well known in the art, and therefore, will not be described any further.

The processor 2516 is responsible for general processing, including the execution of software, code and/or instructions stored on the processor-readable storage medium 2518. The processor-readable storage medium may include a non-transitory storage medium. The software, when executed by the processor 2516, causes the processing circuit 2502 to perform the various functions described supra (e.g., the functions described with respect to FIG. 24) for any particular apparatus. The processor-readable storage medium may be used for storing data that is manipulated by the processor 2516 when executing software. The processing circuit 2502 further includes at least one of the modules and/or circuits 2504, 2506, 2508, and 2510. The modules and/or circuits 2504, 2506, 2508 and 2510 may be software modules running in the processor 2516, resident/stored in the processor-readable storage medium 2518, one or more hardware modules coupled to the processor 2516, or some combination thereof. The modules and/or circuits 2504, 2506, 2508, and 2510 may include microcontroller instructions, state machine configuration parameters, or some combination thereof.

In one configuration, the apparatus 2500 includes modules and/or circuits 2504 configured to communicate a configuration message indicating whether a load-exponent mode is enabled or disabled, modules and/or circuits 2506 configured to generate an address field in a datagram including setting a value of at least one bit in the address field to indicate a number of bytes of data associated with a data frame of the datagram, modules and/or circuits 2508 configured to generate the data frame in the datagram, the data frame including the number of bytes of data indicated by the value of the at least one bit in the address field, and modules and/or circuits 2510 configured to send the datagram to the receiving device via a bus interface.

Figure 26:
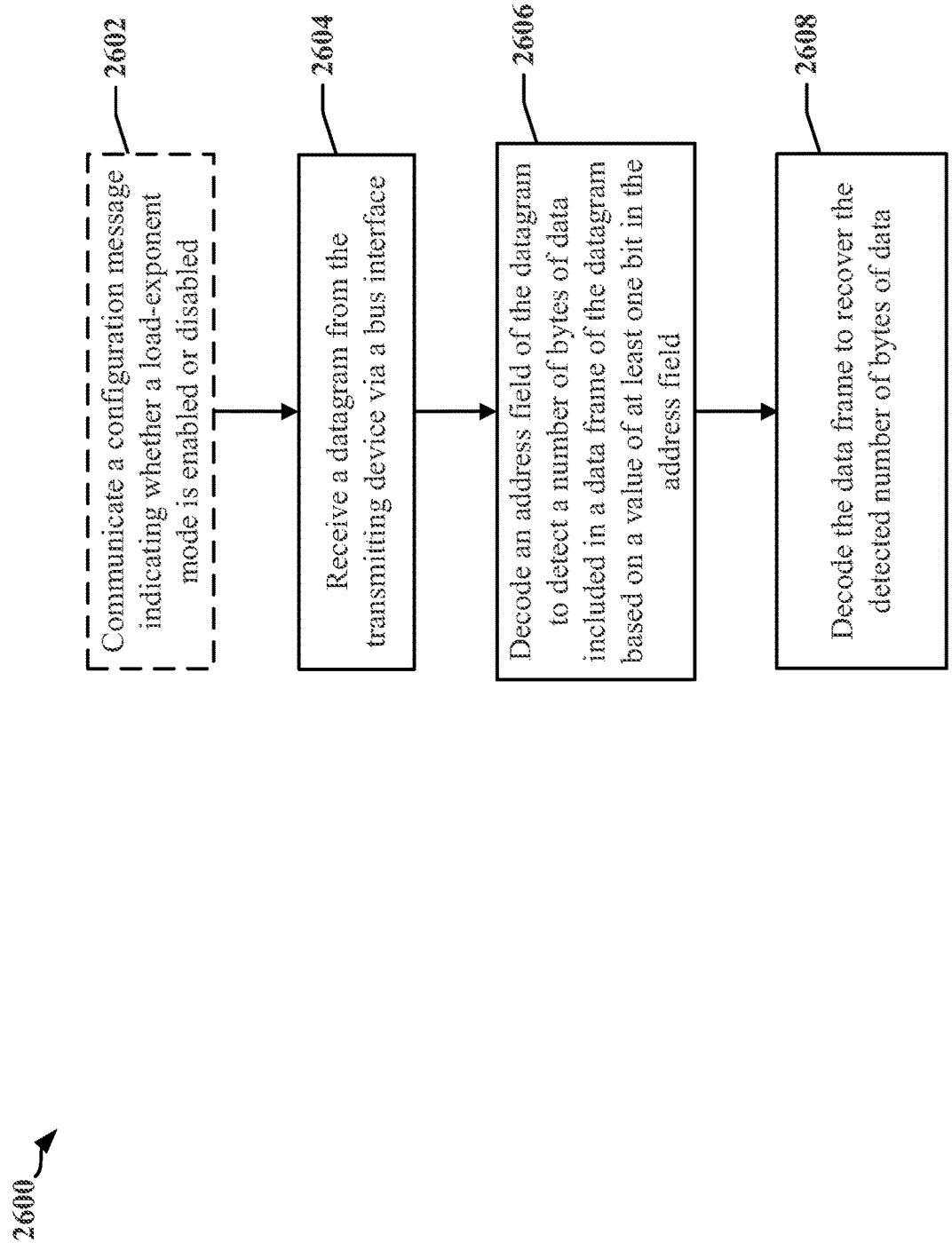
FIG. 26 is a second flowchart illustrating certain operations of an application processor adapted in accordance with certain aspects disclosed herein.

FIG. 26 is a flowchart 2600 of a method that may be performed at a receiving device (e.g., SPMI master) for receiving a datagram from a transmitting device (e.g., request-capable slave (RCS)). In an aspect, the transmitting device is the RCS and the datagram is received across a system power management interface (SPMI) bus. The datagram may be a master read datagram provoking the receiving device to perform a read operation with respect to data included in a data frame of the datagram. Alternatively, the datagram may be a master write datagram provoking the receiving device to perform a write operation with respect to the data included in the data frame.

At block 2602, the transmitting device may optionally communicate (receive or transmit) a configuration message indicating whether a load-exponent mode is enabled or disabled.

At block 2604, the receiving device may receive a datagram from the transmitting device via a bus interface. The datagram may be received from the transmitting device independent of software involvement after initialization. In some implementations, the datagram may be received from the transmitting device in accordance with a standards-defined protocol that controls transmissions over a shared communication link. For example, the shared communication link may include a serial bus operated in accordance with an I3C, RFFE, SPMI or other protocol defined by the MIPI Alliance.

At block 2606, the receiving device may decode an address field of the datagram to detect a number of bytes of data included in a data frame of the datagram based on a value of at least one bit in the address field. In an aspect, a first portion of the address field includes the at least one bit on which detection of the number of bytes of data is based, and a second portion of the address field includes at least one other bit corresponding to an address of the receiving device.

In an aspect, when decoding the address field, the receiving device may read a first bit value and a second bit value in the address field, detect whether a load-exponent mode is enabled or disabled, and detect the number of bytes of data included in the data frame based on at least the first bit value and the second bit value and whether the load-exponent mode is enabled or disabled. Moreover, when detecting the number of bytes of data included in the data frame, the receiving device may calculate a binary coded decimal value of the first bit value and the second bit value. Accordingly, if the load-exponent mode is disabled, the binary coded decimal value of the first bit value and the second bit value is equal to M, where M is an integer greater than or equal to 0 and less than or equal to 3 ($0 \leq M \leq 3$), and the detected number of bytes of data is equal to M+1. If the load-exponent mode is enabled, the binary coded decimal value of the first bit value and the second bit value is equal to N, where N is an integer greater than or equal to 0 and less than or equal to 3 ($0 \leq N \leq 3$), and the detected number of bytes of data is equal to $2^N$. Furthermore, when decoding the address field, the receiving device may detect whether bit values of other bits (e.g., a third bit value and a fourth bit value) in the address field correspond to an address of the receiving device. If the bit values do not correspond to the address of the receiving device, the receiving device may cease, or refrain from, the decoding of the data frame.

In another aspect, when decoding the address field, the receiving device may further read a third bit value and a fourth bit value in the address field and detect the number of bytes of data included in the data frame further based on the third bit value and the fourth bit value. In an example, if the load-exponent mode is disabled, the receiving device may calculate a binary coded decimal value of the first bit value, the second bit value, the third bit value, and the fourth bit value, wherein the binary coded decimal value of the first bit value, the second bit value, the third bit value, and the fourth bit value is equal to P, where P is an integer greater than or equal to 0 and less than or equal to 15 ($0 \leq P \leq 15$). Accordingly, the detected number of bytes of data is equal to P+1.

In another example, if the load-exponent mode is enabled, the receiving device may calculate a first binary coded decimal value of the first bit value and the second bit value, wherein the first binary coded decimal value of the first bit value and the second bit value is equal to Q, where Q is an integer greater than or equal to 0 and less than or equal to 3 ($0 \leq Q \leq 3$). The receiving device may also calculate a second binary coded decimal value of the third bit value and the fourth bit value, wherein the second binary coded decimal value of the third bit value and the fourth bit value is equal to R, where R is an integer greater than or equal to 0 and less than or equal to 3 ($0 \leq R \leq 3$). Accordingly, the detected number of bytes of data is equal to $2^Q + 2^R$.

At block 2608, the receiving device may decode the data frame to recover the detected number of bytes of data. In an example, when decoding the data frame, the receiving device may detect a bus park (BP) at an end of the number of bytes of data in the data frame. In another example, when decoding the data frame, the receiving device may detect a bus park (BP) between each byte of data of the number of bytes of data in the data frame.

Figure 27:
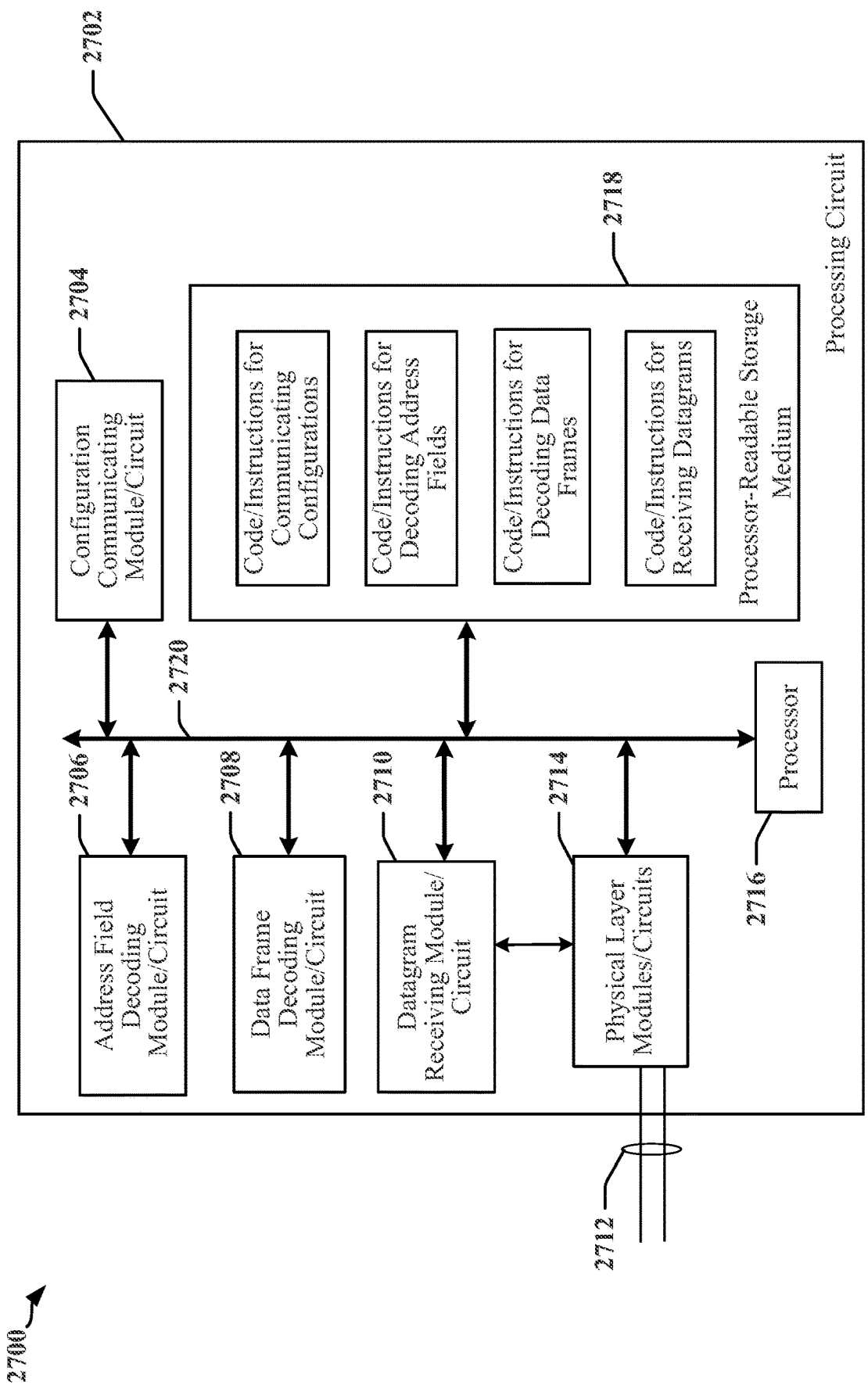
FIG. 27 illustrates a second example of a hardware implementation for an apparatus adapted in accordance with certain aspects disclosed herein.

FIG. 27 is a diagram illustrating a simplified example of a hardware implementation for an apparatus 2700 employing a processing circuit 2702. The apparatus may implement a bridging circuit in accordance with certain aspects disclosed herein. The processing circuit typically has a controller or processor 2716 that may include one or more microprocessors, microcontrollers, digital signal processors, sequencers and/or state machines. The processing circuit 2702 may be implemented with a bus architecture, represented generally by the bus 2720. The bus 2720 may include any number of interconnecting buses and bridges depending on the specific application of the processing circuit 2702 and the overall design constraints. The bus 2720 links together various circuits including one or more processors and/or hardware modules, represented by the controller or processor 2716, the modules and/or circuits 2704, 2706, 2708, and 2710 and the processor-readable storage medium 2718. One or more physical layer circuits and/or modules 2714 may be provided to support communications over a communication link implemented using a multi-wire bus 2712 or other communication structure. The bus 2720 may also link various other circuits such as timing sources, peripherals, voltage regulators, and power management circuits, which are well known in the art, and therefore, will not be described any further.

The processor 2716 is responsible for general processing, including the execution of software, code and/or instructions stored on the processor-readable storage medium 2718. The processor-readable storage medium may include a non-transitory storage medium. The software, when executed by the processor 2716, causes the processing circuit 2702 to perform the various functions described supra (e.g., the functions described with respect to FIG. 26) for any particular apparatus. The processor-readable storage medium may be used for storing data that is manipulated by the processor 2716 when executing software. The processing circuit 2702 further includes at least one of the modules and/or circuits 2704, 2706, 2708, and 2710. The modules and/or circuits 2704, 2706, 2708 and 2710 may be software modules running in the processor 2716, resident/stored in the processor-readable storage medium 2718, one or more hardware modules coupled to the processor 2716, or some combination thereof. The modules 2704, 2706, 2708, and 2710 may include microcontroller instructions, state machine configuration parameters, or some combination thereof.

In one configuration, the apparatus 2700 includes modules and/or circuits 2704 configured to communicate a configuration message indicating whether a load-exponent mode is enabled or disabled, modules and/or circuits 2706 configured to decode an address field of a datagram to detect a number of bytes of data included in a data frame of the datagram based pm a value of at least one bit in the address field, modules and/or circuits 2708 configured to decode the data frame to recover the detected number of bytes of data, and modules and/or circuits 2710 configured to receive the datagram from the transmitting device via a bus interface.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method performed at a receiving device for receiving a datagram from a transmitting device, comprising:
    receiving the datagram from the transmitting device via a bus interface;
    decoding an address field of the datagram to detect a number of bytes of data included in a data frame of the datagram based on a value of at least one bit in the address field, wherein the decoding the address field includes:
        reading a first bit value and a second bit value in the address field,
        detecting whether a load-exponent mode is enabled or disabled, and
        detecting the number of bytes of data included in the data frame based on at least the first bit value and the second bit value and whether the load-exponent mode is enabled or disabled; and
    decoding the data frame to recover the detected number of bytes of data.

2. The method of claim 1, wherein the transmitting device is a request-capable slave (RCS) and the datagram is received across a system power management interface (SPMI) bus.

3. The method of claim 1, wherein:
    the datagram is a master read datagram provoking the receiving device to perform a read operation with respect to the data included in the data frame; or
    the datagram is a master write datagram provoking the receiving device to perform a write operation with respect to the data included in the data frame.

4. The method of claim 1, wherein the detecting the number of bytes of data included in the data frame includes:
    calculating a binary coded decimal value of the first bit value and the second bit value,
    wherein if the load-exponent mode is disabled, the binary coded decimal value of the first bit value and the second bit value is equal to M, where M is an integer greater than or equal to 0 and less than or equal to 3 ($0 \leq M \leq 3$), and the detected number of bytes of data is equal to M+1, and
    wherein if the load-exponent mode is enabled, the binary coded decimal value of the first bit value and the second bit value is equal to N, where N is an integer greater than or equal to 0 and less than or equal to 3 ($0 \leq N \leq 3$), and the detected number of bytes of data is equal to $2^N$.

5. The method of claim 4, further including communicating a configuration message indicating whether the load-exponent mode is enabled or disabled.

6. The method of claim 1, wherein the decoding the address field further includes:
   reading a third bit value and a fourth bit value in the address field; and
   detecting the number of bytes of data included in the data frame further based on the third bit value and the fourth bit value,
   wherein if the load-exponent mode is disabled, the detecting the number of bytes of data includes calculating a binary coded decimal value of the first bit value, the second bit value, the third bit value, and the fourth bit value, wherein the binary coded decimal value of the first bit value, the second bit value, the third bit value, and the fourth bit value is equal to P, where P is an integer greater than or equal to 0 and less than or equal to 15 (0≤P≤15), and the detected number of bytes of data is equal to P+1, and
   wherein if the load-exponent mode is enabled, the detecting the number of bytes of data includes calculating a first binary coded decimal value of the first bit value and the second bit value wherein the first binary coded decimal value of the first bit value and the second bit value is equal to Q, where Q is an integer greater than or equal to 0 and less than or equal to 3 (0≤Q≤3), and calculating a second binary coded decimal value of the third bit value and the fourth bit value, wherein the second binary coded decimal value of the third bit value and the fourth bit value is equal to R, where R is an integer greater than or equal to 0 and less than or equal to 3 (0≤R≤3), and the detected number of bytes of data is equal to $2^Q+2^R$.

7. The method of claim 1, wherein the decoding the data frame includes at least one of:
   detecting a bus park (BP) at an end of the number of bytes of data in the data frame; or
   detecting the BP between each byte of data of the number of bytes of data in the data frame.

8. The method of claim 1, wherein a first portion of the address field includes the at least one bit on which detection of the number of bytes of data is based and a second portion of the address field includes at least one other bit corresponding to an address of the receiving device.

9. A receiving device for receiving a datagram from a transmitting device, comprising:
   a bus interface; and
   a processing circuit coupled to the bus interface and configured to:
      receive the datagram from the transmitting device via the bus interface,
      decode an address field of the datagram to detect a number of bytes of data included in a data frame of the datagram based on a value of at least one bit in the address field wherein the processing circuit configured to decode the address field is configured to:
         read a first bit value and a second bit value in the address field,
         detect whether a load-exponent mode is enabled or disabled, and
         detect the number of bytes of data included in the data frame based on at least the first bit value and the second bit value and whether the load-exponent mode is enabled or disabled, and
      decode the data frame to recover the detected number of bytes of data.

10. The receiving device of claim 9, wherein:
    the datagram is a master read datagram provoking the receiving device to perform a read operation with respect to the data included in the data frame; or
    the datagram is a master write datagram provoking the receiving device to perform a write operation with respect to the data included in the data frame.

11. The receiving device of claim 9, wherein the processing circuit configured to detect the number of bytes of data included in the data frame is configured to:
    calculate a binary coded decimal value of the first bit value and the second bit value,
    wherein if the load-exponent mode is disabled, the binary coded decimal value of the first bit value and the second bit value is equal to M, where M is an integer greater than or equal to 0 and less than or equal to 3 (0≤M≤3), and the detected number of bytes of data is equal to M+1, and
    wherein if the load-exponent mode is enabled, the binary coded decimal value of the first bit value and the second bit value is equal to N, where N is an integer greater than or equal to 0 and less than or equal to 3 (0≤N≤3), and the detected number of bytes of data is equal to $2^N$.

12. The receiving device of claim 11, the processing circuit further configured to communicate a configuration message indicating whether the load-exponent mode is enabled or disabled.

13. The receiving device of claim 9, wherein the processing circuit configured to decode the data frame is configured to at least one of:
    detect a bus park (BP) at an end of the number of bytes of data in the data frame; or
    detect the BP between each byte of data of the number of bytes of data in the data frame.

14. A receiving device for receiving a datagram from a transmitting device, comprising:
    means for receiving the datagram from the transmitting device via a bus interface;
    means for decoding an address field of the datagram to detect a number of bytes of data included in a data frame of the datagram based on a value of at least one bit in the address field, wherein the means for decoding the address field is configured to:
       read a first bit value and a second bit value in the address field,
       detect whether a load-exponent mode is enabled or disabled, and
       detect the number of bytes of data included in the data frame based on at least the first bit value and the second bit value and whether the load-exponent mode is enabled or disabled; and
    means for decoding the data frame to recover the detected number of bytes of data.

15. The receiving device of claim 14, wherein the means for decoding the address field is further configured to:
    calculate a binary coded decimal value of the first bit value and the second bit value,
    wherein if the load-exponent mode is disabled, the binary coded decimal value of the first bit value and the second bit value is equal to M, where M is an integer greater than or equal to 0 and less than or equal to 3 (0≤M≤3), and the detected number of bytes of data is equal to M+1, and
    wherein if the load-exponent mode is enabled, the binary coded decimal value of the first bit value and the second bit value is equal to N, where N is an integer greater than or equal to 0 and less than or equal to 3 ($0 \leq N \leq 3$), and the detected number of bytes of data is equal to $2^N$.

16. The receiving device of claim 15, further including means for communicating a configuration message indicating whether the load-exponent mode is enabled or disabled.

17. The receiving device of claim 14, wherein the means for decoding the address field is further configured to:
    read a third bit value and a fourth bit value in the address field; and
    detect the number of bytes of data included in the data frame further based on the third bit value and the fourth bit value,
    wherein if the load-exponent mode is disabled, the means for decoding the address field is configured to detect the number of bytes of data by calculating a binary coded decimal value of the first bit value, the second bit value, the third bit value, and the fourth bit value, wherein the binary coded decimal value of the first bit value, the second bit value, the third bit value, and the fourth bit value is equal to P, where P is an integer greater than or equal to 0 and less than or equal to 15 ($0 \leq P \leq 15$), and the detected number of bytes of data is equal to P+1, and
    wherein if the load-exponent mode is enabled, the means for decoding the address field is configured to detect the number of bytes of data by calculating a first binary coded decimal value of the first bit value and the second bit value wherein the first binary coded decimal value of the first bit value and the second bit value is equal to Q, where Q is an integer greater than or equal to 0 and less than or equal to 3 ($0 \leq Q \leq 3$), and calculating a second binary coded decimal value of the third bit value and the fourth bit value, wherein the second binary coded decimal value of the third bit value and the fourth bit value is equal to R, where R is an integer greater than or equal to 0 and less than or equal to 3 ($0 \leq R \leq 3$), and the detected number of bytes of data is equal to $2^Q+2^R$.

18. The receiving device of claim 14, wherein the means for decoding the data frame is configured to at least one of:
    detect a bus park (BP) at an end of the number of bytes of data in the data frame; or
    detect the BP between each byte of data of the number of bytes of data in the data frame.

19. The receiving device of claim 9, wherein the processing circuit configured to decode the address field is configured to:
    read a third bit value and a fourth bit value in the address field; and
    detect the number of bytes of data included in the data frame further based on the third bit value and the fourth bit value,
    wherein if the load-exponent mode is disabled, the processing circuit configured to decode the address field is configured to detect the number of bytes of data by calculating a binary coded decimal value of the first bit value, the second bit value, the third bit value, and the fourth bit value, wherein the binary coded decimal value of the first bit value, the second bit value, the third bit value, and the fourth bit value is equal to P, where P is an integer greater than or equal to 0 and less than or equal to 15 ($0 \leq P \leq 15$), and the detected number of bytes of data is equal to P+1, and
    wherein if the load-exponent mode is enabled, the processing circuit configured to decode the address field is configured to detect the number of bytes of data by calculating a first binary coded decimal value of the first bit value and the second bit value wherein the first binary coded decimal value of the first bit value and the second bit value is equal to Q, where Q is an integer greater than or equal to 0 and less than or equal to 3 ($0 \leq Q \leq 3$), and calculating a second binary coded decimal value of the third bit value and the fourth bit value, wherein the second binary coded decimal value of the third bit value and the fourth bit value is equal to R, where R is an integer greater than or equal to 0 and less than or equal to 3 ($0 \leq R \leq 3$), and the detected number of bytes of data is equal to $2^Q+2^R$.

20. The receiving device of claim 9, wherein a first portion of the address field includes the at least one bit on which detection of the number of bytes of data is based and a second portion of the address field includes at least one other bit corresponding to an address of the receiving device.

* * * * *